US008990532B2

(12) United States Patent
Obata et al.

(10) Patent No.: US 8,990,532 B2
(45) Date of Patent: *Mar. 24, 2015

(54) METHOD OF MANAGING MEMORY IN COMPUTER SYSTEM, COMPUTER SYSTEM AND MEMORY MANAGING PROGRAM

(75) Inventors: Motoki Obata, Toda (JP); Hiroyasu Nishiyama, Kawasaki (JP); Masahiko Adachi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 386 days.

This patent is subject to a terminal disclaimer.

(21) Appl. No.: 13/386,348

(22) PCT Filed: Mar. 8, 2010

(86) PCT No.: PCT/JP2010/054273
§ 371 (c)(1),
(2), (4) Date: Apr. 23, 2012

(87) PCT Pub. No.: WO2011/104897
PCT Pub. Date: Sep. 1, 2011

(65) Prior Publication Data
US 2012/0221821 A1 Aug. 30, 2012

(30) Foreign Application Priority Data
Feb. 23, 2010 (JP) .................. 2010-037069

(51) Int. Cl.
*G06F 12/00* (2006.01)
*G06F 12/02* (2006.01)
*G06F 17/30* (2006.01)

(52) U.S. Cl.
CPC ........ *G06F 12/0253* (2013.01); *G06F 12/0261* (2013.01); *G06F 17/30079* (2013.01); *G06F 12/023* (2013.01); *G06F 17/30085* (2013.01)

USPC ................... 711/165; 711/170; 711/E12.009; 707/813

(58) Field of Classification Search
CPC ............ G06F 12/0253; G06F 12/0261; G06F 17/30085; G06F 17/30079; G06F 12/023
USPC ........................ 711/165, 154; 707/813, 812
See application file for complete search history.

(56) References Cited

U.S. PATENT DOCUMENTS 7,788,300 B2 *  8/2010  Kuck et al. .................... 707/813
7,793,049 B2 *  9/2010  Cain et al. ..................... 711/133

(Continued)

FOREIGN PATENT DOCUMENTS

JP        2003-186737 A      7/2003
JP        2009 037547 A      2/2009

OTHER PUBLICATIONS
Pizlo et al, "Real-Time Java Scoped Memory: Design Patterns and Semantics", IEEE International Symposium on Object-Oriented Read-Time Distributed Computing, 2004.*

(Continued)

*Primary Examiner* — Pierre-Michel Bataille
(74) *Attorney, Agent, or Firm* — Foley & Lardner LLP

(57) ABSTRACT

A method of managing a memory in a computer system including a processor executing programs and the memory, the memory including a first area, which is managed by a garbage collector, and a second area, which is not managed by the garbage collector, the method including the steps executed by the processor of: checking a reference relation of basic point data associated with the second area by tracing references from the basic point data; when the reference relation of the basic point data has a structure including a reference to data belonging to the same class as the class of the basic point data, determining that particular data out of data constituting the structure is prohibited from being migrated to the second area; and migrating data stored in the first area out of data remaining after excluding the particular data from the data constituting the structure to the second area.

8 Claims, 23 Drawing Sheets

(56) References Cited

U.S. PATENT DOCUMENTS

| | | | |
|---|---|---|---|
| 8,214,620 B2* | 7/2012 | Watanabe et al. | 711/171 |
| 8,224,874 B2* | 7/2012 | Guo et al. | 707/813 |
| 8,301,671 B1* | 10/2012 | Greenwood et al. | 707/813 |
| 2003/0097537 A1 | 5/2003 | Bollella et al. | |
| 2003/0140071 A1 | 7/2003 | Kawamoto | |
| 2009/0037684 A1 | 2/2009 | Obata et al. | |
| 2010/0077170 A1* | 3/2010 | Adachi et al. | 711/165 |
| 2012/0066270 A1* | 3/2012 | Kravets | 707/812 |

OTHER PUBLICATIONS

Pizlo, F. et al.; Real-Time Java Scoped Memory: Design Patterns and Semantics; Proceedings of the Seventh IEEE International Symposium on Object-Oriented Real-Time Distributed Computing, 2004; 10 pages.

Obata, Motoki, et al.; Explicitly Managed Heap; Memory for Java; Information Processing Society of Japan, vol. 50, No. 7, Jul. 2009; pp. 1693-1715.

PCT International Search Report and Written Opinion on application PCT/JP2010/054273 mailed Aug. 10, 2010; 8 pages.

\* cited by examiner

METHOD OF MANAGING MEMORY IN COMPUTER SYSTEM, COMPUTER SYSTEM AND MEMORY MANAGING PROGRAM

BACKGROUND OF THE INVENTION

This invention relates to a memory management method, and more particularly, to a method of managing a memory in a computer system that uses both a memory area that is managed by a garbage collector and a memory area that is not managed by the garbage collector.

In developing a computer program, memory management such as the allocation/deallocation of a memory area used by the program is one of the laborious tasks that a programmer faces. As a solution to this, a garbage collector is often used.

Java is one of the language processing systems that use a garbage collector to manage a memory. The language specification of Java is equipped with an API for allocating a memory when a program is executed, but not with an API for memory deallocation. A memory area allocated in the process of executing the program is deallocated automatically by a garbage collector installed in a Java virtual machine. A popular mode of memory deallocation processing by a garbage collector (garbage collection, hereinafter abbreviated as "GC") is to suspend all threads that are being run by the Java program while unnecessary data is collected.

A Java virtual machine activates GC immediately before the consumed amount of a Java heap which stores data generated by the Java program (Java objects) exceeds a certain threshold. However, it is difficult for a user to estimate the consumed amount of the Java heap and to predict when the consumed amount of the Java heap will exceed the threshold. This gives rise to a problem in that the activation of GC suspends the execution of the program irregularly.

As a method of installing GC in a Java virtual machine, generational garbage collection is often employed which uses copy GC requiring a short suspension period in some cases and full GC requiring a long suspension period in other cases. It is, however, difficult in generational garbage collection to predict which of the two types of GC will be activated next time. The resultant problem is that an unexpected activation of GC suspends the execution of the program and consequently lowers the response of the entire system.

Various inventions have been made to solve these problems (see JP 2009-37547 A, F. Pizlo, J. M. Fox, D. Holmes and J. Vitek, Real-Time Java Scoped Memory: Design Patterns and Semantics, In Proceedings of the Seventh IEEE International Symposium on Object-Oriented Real-Time Distributed Computing, 2004, and Motoki Obata, Hiroyasu Nishiyama, Masahiko Adachi, Koichi Okada, Takuma Nagase, Kei Nakajima, "Explicit Memory Management in Java", IPSJ Transactions Vol. 50, No. 7, pp. 1693-1715, July 2009). The documents deal with providing a memory area that is not counted as a target of GC (hereinafter, referred to as "external heap") in addition to a memory area that is a target of GC (hereinafter, referred to as "Java heap"). An external heap is a memory area that can be managed by the program. The allocation of an external heap, the generation of an object in the external heap, and the deallocation of the external heap are executed in accordance with descriptions written in a source code of the program by the programmer.

F. Pizlo et al, supra discloses putting limitations on data that is generated in an external heap. The limitations are to restrict the generation of data in the external heap referred to from data that is within the Java heap. This guarantees that, when the count of running threads of the program that access data within an external heap becomes 0, automatically deallocating the external heap along with data stored therein does not affect the results of executing the program. In short, an external heap can be deallocated safely with the overhead kept low. If an external heap is deallocated while data within the Java heap is referring to data within an external heap, it means that the reference from the data within the Java heap points to an invalid area (deallocated memory area). Then the execution of the program cannot continue in a normal manner.

However, the technology disclosed in F. Pizlo et al, supra has problems such as the need for a user to program by constantly keeping in mind reference relations between pieces of data, and an increase in program scale or implicit data generation which is not written in the program makes it very difficult to keep track of reference relations in memory areas. Other problems are that whether or not the limitations are violated is not clear until the program is actually executed, the program is not executed in a normal manner in many cases when the limitations are violated causing exceptions, checking details of the limitations at the time of executing the program lowers the performance markedly, and the like.

To solve these problems, JP 2009-37547 A and Motoki Obata et al, supra disclose that an external heap can be used without putting limitations on data that is generated in the external heap. With the technologies disclosed in JP 2009-37547 A and Motoki Obata et al, supra, when deallocating an external heap, reference relations of data within the deallocation target external heap with data within non-deallocation target memory areas (Java heap and non-deallocation target external heaps) are checked and, of the data within the deallocation target external heap, data that is necessary for the subsequent execution of the program is migrated to a non-deallocation target memory area. The deallocation target external heap is thus deallocated while guaranteeing that the deallocation causes no trouble in the subsequent execution of the program. This also allows a user to program by utilizing an API for external heaps without paying attention to data reference relations. The check described above is executed only when an external heap is deallocated, which means that overhead due to conducting the check at other times such as when the program is executed is avoided.

FIG. 1A is a diagram illustrating an example of using a conventional common Java API. A program 201 includes a step 202 of generating "List" class data li and a step 206 of generating "Obj" class data o1 and o2 and letting the data li generated in the step 202 refer to the data o1 and the data o2.

FIG. 1B is a diagram illustrating an example of using a conventional external heap API. A program 203 is a modification of the program 201 of FIG. 1A. This program 203 includes a step 204 of generating an external heap, a step 205 of generating "List" class data li in the generated external heap, the step 206 described above, and a step 207 of deallocating (deleting) the generated external heap. In the step 204, in particular, an external heap is generated by generating "ReferenceExplicitMemory" class data em. In the case where the data within the external heap generated in the step 204 is referred to from data within another memory area, the external heap is deallocated in the step 207 after the data within the external heap is migrated to the other memory area.

Data can be placed in an external heap by two different methods. One method is to put every piece of data generated within one segment of the program in an external heap (see JP 2009-37547 A). The other method is to put data that can be referred to from data associated with an external heap (hereinafter, referred to as "basic point data") in the external heap (see Motoki Obata et al, supra). The program of FIG. 1B is for using the latter method. In other words, the "List" class data li is associated in the step 205 with the external heap generated in the step 204 on the premise that the latter method is used.

FIG. 2 is a diagram illustrating how data is placed conventionally after a program using an external heap API (see FIG. 1B) is executed. An external heap 110 is generated in the step 204 of FIG. 1B. The "List" class data li generated in the step 205 which is denoted by 301 is placed in the external heap 110 as basic point data. In a Java heap 109 of FIG. 2, on the other hand, the "Obj" class data o1 (302) and the "Obj" class data o2 (303) which are generated in the step 206 and other data F (305) are placed. As indicated by references 304-1 and 304-2, the basic point data li 301 refers to the data o1 (302) and the data o2 (303). The data F 305 refers to the data o1 (302) as indicated by a reference 306.

A case of migrating the data o1 (302) and the data o2 (303) to the external heap 110 is considered. The migration is timed with the execution of GC, a rise in the consumed amount of the Java heap above a certain threshold, or the like.

FIG. 3 is a diagram illustrating how data is placed conventionally after data that can be referred to from basic point data is migrated to an external heap. In FIG. 3, data o1 (401) and data o2 (402) which can be referred to from the basic point data li 301 are migrated to the external heap 110.

If the external heap 110 is deallocated at this point, it means that the reference 306 points to an invalid area (deallocated memory area). The execution of the program cannot continue in a normal manner in this case. Accordingly, when there is a reference from the data F 305 within the non-deallocation target Java heap 109 to the data o1 (401) within the deallocation target external heap 110, the data of (401) is migrated to the Java heap 109 (see FIG. 4).

FIG. 4 is a diagram illustrating how data is placed conventionally when data within a deallocation target external heap is migrated to a non-deallocation target memory area. In FIG. 4, the data o1 (401) is migrated to the Java heap 109 as data o1' (501). The reference 306 of FIG. 3 is updated as a reference 502 of FIG. 4.

The data o1 (401) and the data o1' (501) are the same data and the reference 502 is synonymous with the reference 306. In this case, deallocating the external heap 110 along with the data li 301, the data of (401), and the data o2 (402) does not cause a trouble in the subsequent execution of the program.

RELATED DOCUMENTS

Patent document 1: JP 2009-37547 A

Non Patent document 1: F. Pizlo, J. M. Fox, D. Holmes and J. Vitek, Real-Time Java Scoped Memory: Design Patterns and Semantics, In Proceedings of the Seventh IEEE International Symposium on Object-Oriented Real-Time Distributed Computing, 2004

Non Patent document 2: Motoki Obata, Hiroyasu Nishiyama, Masahiko Adachi, Koichi Okada, Takuma Nagase, Kei Nakajima, "Explicit Memory Management in Java", IPSJ Transactions Vol. 50, No. 7, pp. 1693-1715, July 2009

SUMMARY OF THE INVENTION

With the method described above which puts data that can be referred to from basic point data in an external heap, all data groups within the Java heap that basic point data can refer to are migrated to an external heap. This makes it difficult to specify only a particular data group out of these data groups as a data group to be migrated to an external heap.

For instance, consider a case where data at the top of a reference relation of data groups that are generated by given processing is basic point data, and only data groups that can be referred to from this basic point data are migrated to one external heap. In this case, unexpected data migration could occur if the basic point data is in a specific data structure.

FIG. 10 is a diagram illustrating a circle structure reference relation among pieces of data. In FIG. 10, a circular mark represents data, an alphabet letter inside the circular mark represents the affiliated class of the data, and an arrow represents a reference relation between pieces of data. For example, a reference 1107 indicates that data 1101 whose affiliated class is A refers to data 1102 whose affiliated class is B.

Discussed here is a case of migrating only data 1103-1 and data 1104-1, which can be referred to from the data 1103-1, to one external heap with the data 1103-1 as basic point data. In this case, a reference relation among the data 1103-1, the data 1104-1, the data 1101, the data 1102, and the data 1103-1 has a circle structure as illustrated in FIG. 10. In a conventional data placement method, the data 1101 and the data 1102 are migrated to the one external heap as well, as data that can be referred from the basic point data 1103-1.

FIG. 21 is a diagram illustrating a list structure reference relation among pieces of data. In FIG. 21, a reference 1504-1, for example, indicates that data 1501-1 whose affiliated class is F refers to data 1501-2, which belongs to the same class, F.

Consider a case where only the data 1501-1 and data 1502-1 and data 1503-1, which can be referred to from the data 1501-1, are migrated to one external heap with the data 1501-1 as basic point data. In this case, a reference relation among the data 1501-1, the data 1501-2, and data 1501-3 has a self-reference-type list structure as illustrated in FIG. 21. In a conventional data placement method, the data 1501-2 and the data 1501-3 are migrated to the one external heap as well, as data that can be referred to from the basic point data 1501-1.

As described above with reference to FIG. 10 and FIG. 21, when basic point data is in a specific data structure (such as a circle structure or a list structure), unexpected data migration could occur. Consequently, the generated external heap has a size that is different from the estimation made by the user, which, in turn, causes a problem in the deallocating processing of the external heap. External heap deallocation processing requires, as described, migrating data that is stored in an external heap and that is necessary for the subsequent execution of the program to another memory area. However, when basic point data is in a specific data structure, a "data group migrated as intended" and a "data group migrated unexpectedly" are placed in an external heap. The former and the latter differ from each other in regard to their data lifetimes in most cases. An external heap in which a "data group migrated unexpectedly" is placed is kept allocated for longer than other external heaps where only "data groups migrated as intended" are placed. In other words, the period of time in which an external heap is kept allocated varies greatly from one external heap to another.

As methods of solving this problem, searching for another piece of data that can serve as basic point data, modifying the program in a manner that does not put basic point data in a specific structure, and the like can be given. These solving methods, however, impair the convenience of external heap significantly.

This invention has been made in view of the problems described above, and it is an object of this invention to provide a memory management method, a computer system, and a memory management program in which a memory area can be used efficiently without impairing the convenience of external heap even when basic point data is in a specific data structure (circle structure or list structure).

A representative example of the invention disclosed in this application is a method of managing a memory in a computer system that includes a processor for executing a program and the memory, the memory including a first area, which is managed by a garbage collector, and a second area, which is not managed by the garbage collector, the method including the steps of: checking, by the processor, a reference relation of basic point data which is associated with the second area by tracing references from the basic point data; in a case where the reference relation of the basic point data has a structure that includes a reference to data belonging to the same class as a class of the basic point data, determining, by the processor, that particular data out of data that constitutes the structure is prohibited from being migrated to the second area; and migrating, by the processor, to the second area, data that is stored in the first area out of data remaining after excluding the particular data from the data that constitutes the structure.

According to this invention, when basic point data is in a specific data structure (for example, a circle structure or a list structure), particular data among data that this basic point data can refer to is kept from being migrated to the second area. This prevents placing in an external heap particular data which should not be put in an external heap, and allows efficient memory management without impairing the convenience of the external heap.

This invention also allows data placement that conforms to a user's intention and an accurate estimation of the consumed external heap amount. Moreover, this invention reduces fluctuations among external heaps in terms of the period of time in which an external heap is kept allocated.

DETAILED DESCRIPTION OF THE PREFERRED EMBODIMENT

According to an embodiment of this invention, in a computer system that uses both a memory area that is a target of GC (Java heap) and a memory area that is not counted as a target of GC (external heap), processing of migrating data from the Java heap to an external heap based on a reference relation of data (objects) includes prohibiting placing particular data among data that constitutes a specific reference relation (circle structure or list structure) with basic point data (basic point object), which is associated with an external heap, in the same external heap as that of the basic point data.

The embodiment of this invention is described below with reference to the drawings. The following description of the embodiment takes as an example a case of applying this invention to a computer system that is based on Java technology. However, this invention is also applicable to other computer systems that have a GC function.

(Configuration of the Computer System)

Figure 5:
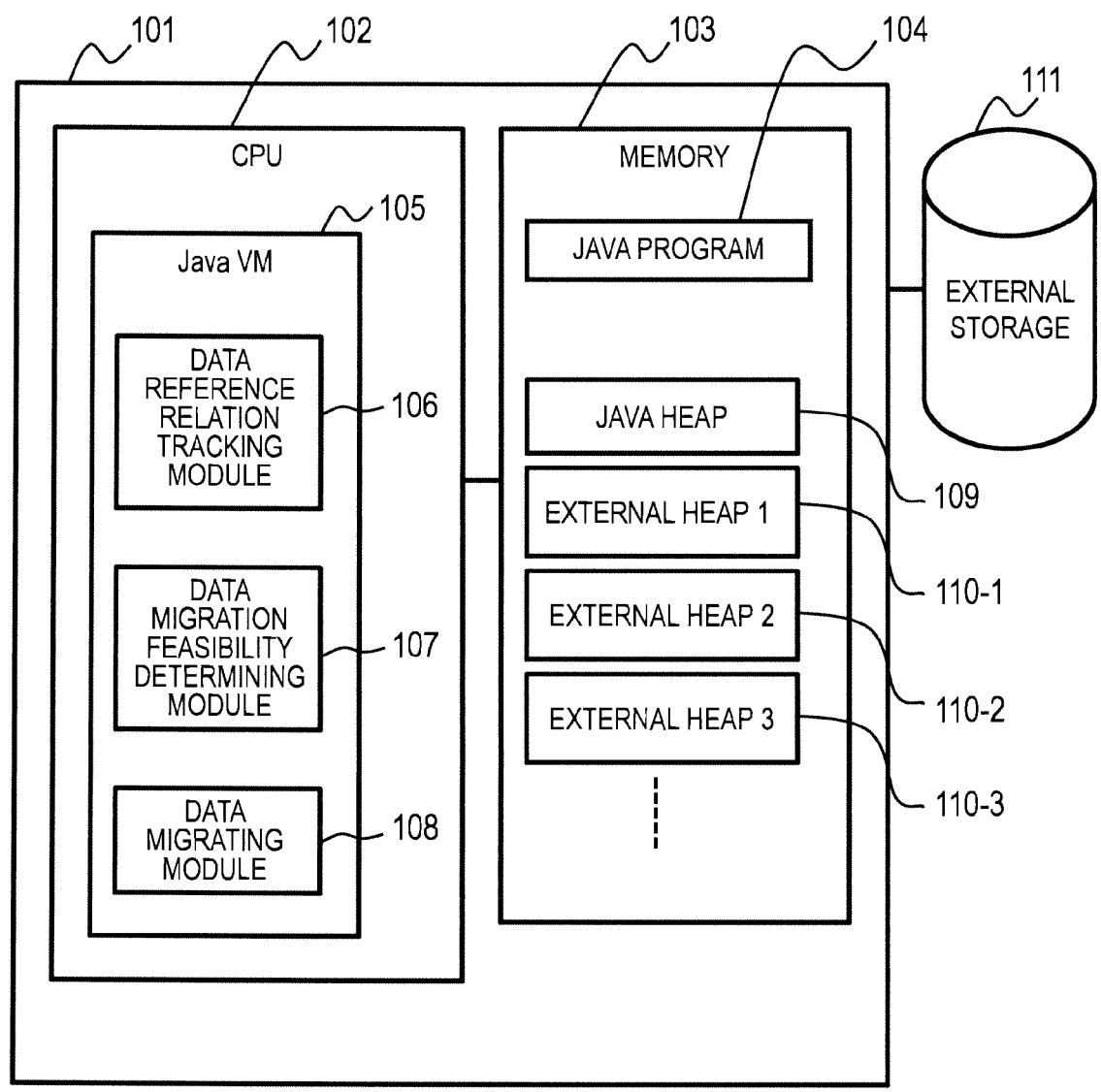
FIG. 5 is a diagram illustrating a configuration example of a computer system according to an embodiment of this invention.

FIG. 5 is a diagram illustrating a configuration example of a computer system 101 according to the embodiment of this invention. The computer system 101 includes a processor (CPU) 102 and a memory 103.

The CPU 102 is a processor which executes various types of processing (here, a Java VM 105 in particular). The Java VM (Java virtual machine) 105 is executed by the CPU 102 to manage the memory 103. The Java VM 105 includes a data reference relation tracking module 106, a data migration feasibility determining module 107, and a data migrating module 108. The Java VM 105 also has a GC function for automatically deallocating a Java heap 109.

The memory 103 is storage for storing various types of data such as a random access memory (RAM). The memory 103 includes a Java program 104, which is executed by the Java VM 105, the Java heap 109, and external heaps 110-1 to 110-3 which are non-GC target memory areas (hereinafter, the external heaps 110-1 to 110-3 are collectively referred to as "external heap 110"). The Java program 104 may be recorded in external storage 111 (HDD or the like) connected to the computer system 101.

The external heap 110 is a type of external heap that allows data within the Java heap 109 that can be referred to from data associated with the external heap 110 to be migrated to the external heap 110 at each given migration time (for example, the activation of GC or time specified by a user). Referable data herein means data that is referred to directly or indirectly. Methods of associating data with the external heap 110 include, for example, one in which data is generated directly in the external heap 110, and one in which the user gives an explicit instruction that the data be associated with the external heap 110. An example of a method of dynamically determining which data is to be associated with the external heap 110 is as follows:

First, out of data groups present in the Java heap 109, data groups that are not referred to directly or indirectly from a stack are obtained. Next, the affiliated classes of the obtained data groups are extracted, which is followed by obtaining, for each extracted class, (a) the combined size of all pieces of data generated from the class and (b) the combined size of all pieces of data that are the reference destinations of the generated data, and calculating a total object size by adding (a) and (b). After that, a class whose total object size exceeds a given threshold is detected and data generated from this class is associated with the external heap 110.

Figure 1A:
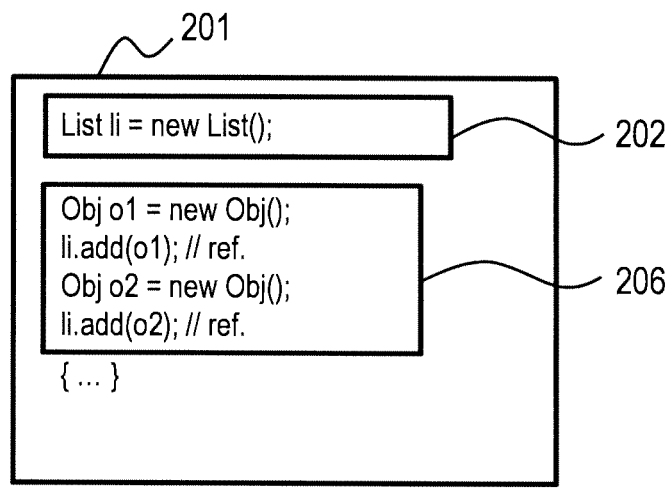
FIG. 1A is a diagram illustrating an example of using a conventional common Java API.
Figure 1B:
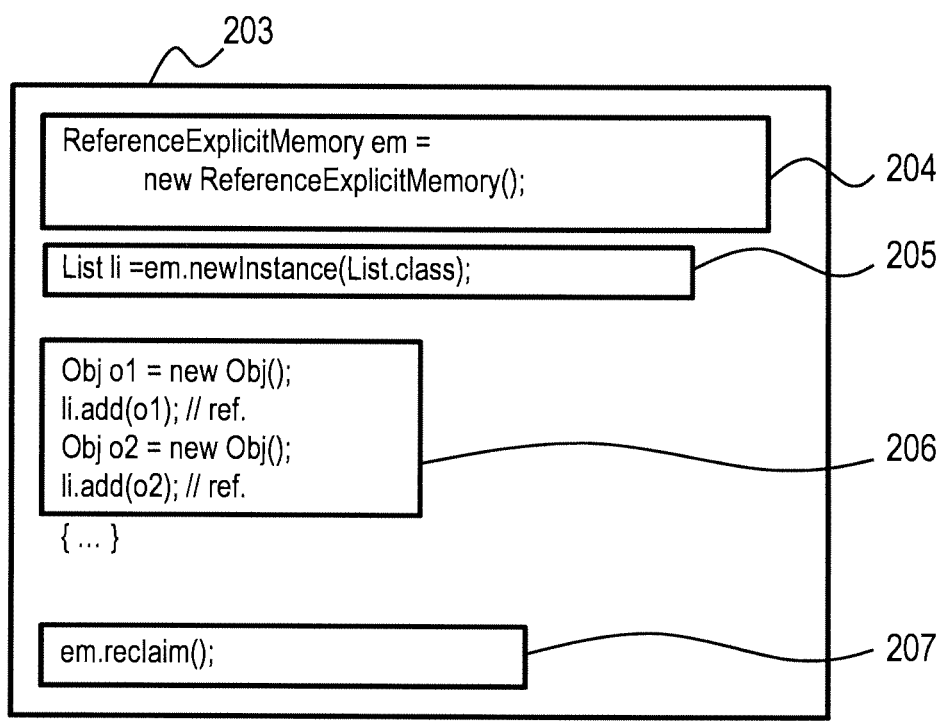
FIG. 1B is a diagram illustrating an example of using a conventional external heap API.
Figure 2:
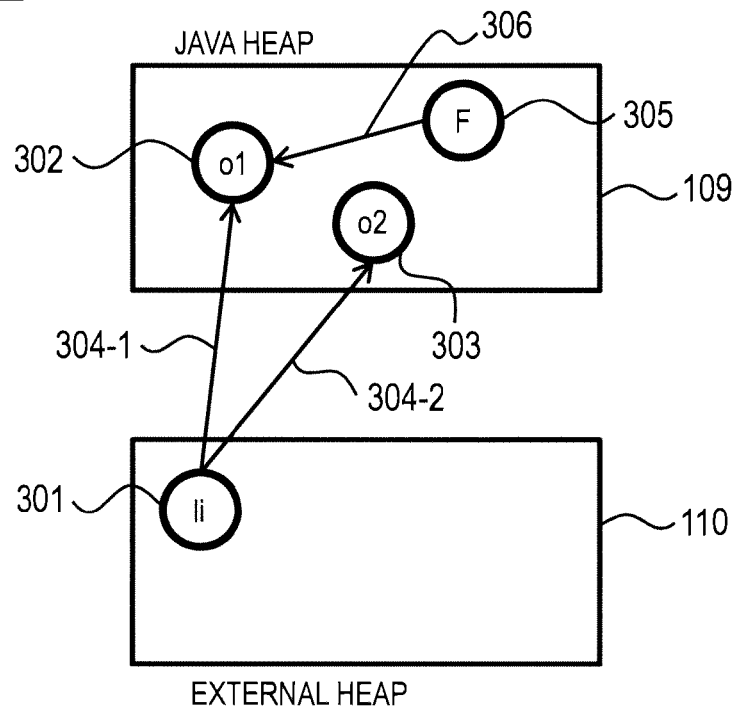
FIG. 2 is a diagram illustrating how data is placed conventionally after a program using an external heap API is executed.
Figure 3:
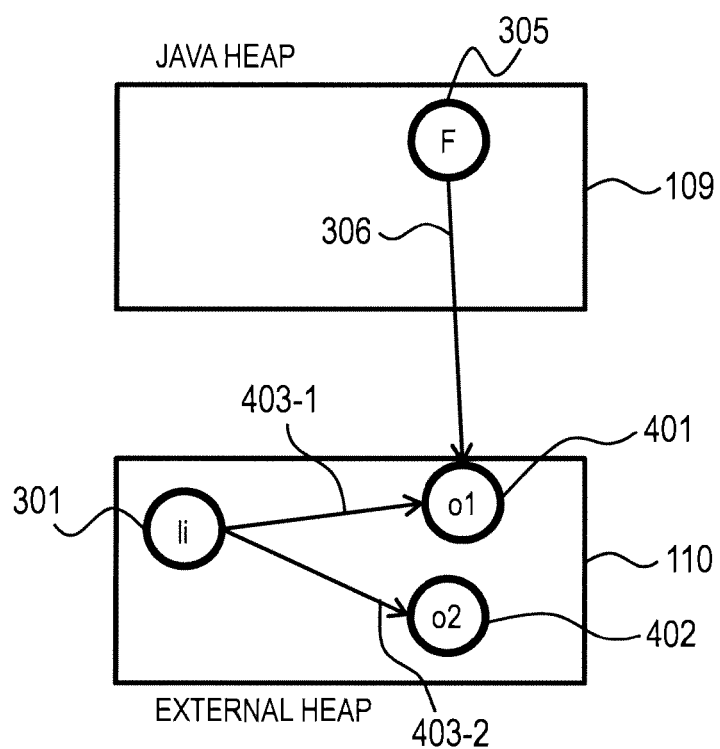
FIG. 3 is a diagram illustrating how data is placed conventionally after data that can be referred to from basic point data is migrated to an external heap.
Figure 4:
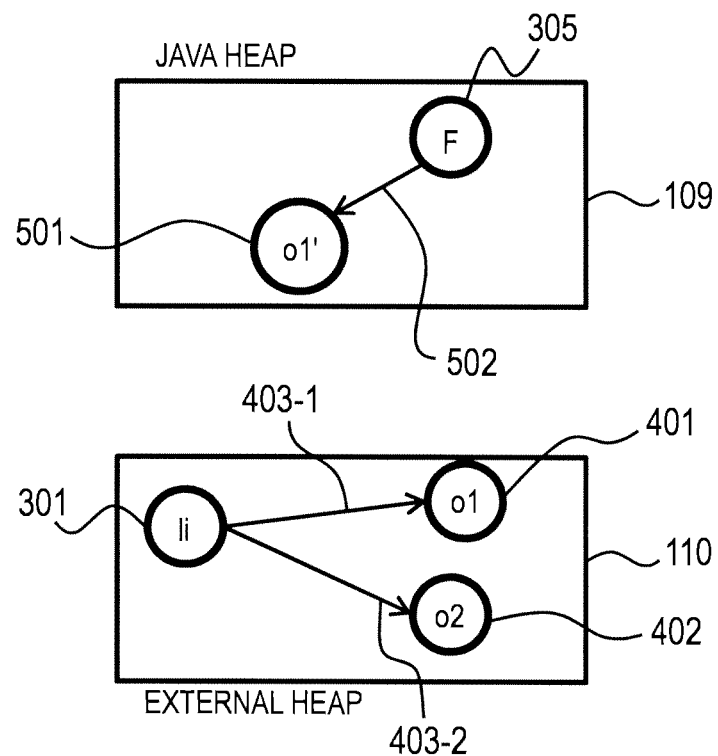
FIG. 4 is a diagram illustrating how data is placed conventionally when data within a deallocation target external heap is migrated to a non-deallocation target memory area.

Once data is associated with the external heap 110, data within the Java heap 109 that can be referred to from this data is migrated to the external heap 110 with which this data is associated, at each given migration time. The data associated with the external heap 110 is data at the top of a reference relation of a data group that is placed in the external heap 110, namely, basic point data. The external heaps 110-1, 110-2, and 110-3 configured as this are generated the number of times an external heap generation bytecode, which is generated by an external heap generation sentence (see the step 204 of FIG. 1B) written in a source code of the Java program 104, is executed.

The data reference relation tracking module 106 included in the Java VM 105 keeps track of reference relations of the basic point data which is data associated with the external heap 110.

The data migration feasibility determining module 107 determines whether or not the migration of data from the Java heap 109 to the external heap 110 is possible based on the data reference relations tracked by the data reference relation tracking module 106.

The data migrating module 108 migrates data from the Java heap 109 to the external heap 110, depending on the result of the determination by the data migration feasibility determining module 107.

The processing of each of these processing modules 106 to 108 utilizes results of the other processing modules 106 to 108. If the processing of the data reference relation tracking module 106 and the processing of the data migration feasibility determining module 107 are executed each time the data migrating module 108 executes its processing, the check will take very long. A preferred time to execute the data reference relation tracking module 106 and the data migration feasibility determining module 107 is therefore, for example, immediately after a series of processing steps that uses the external heap 110 is executed once, or immediately after every class load used by the Java program 104 is finished. The time required for the check via the processing of the data reference relation tracking module 106 and the processing of the data migration feasibility determining module 107 can be shortened in this manner.

(Memory Management Method Outline)

Figure 6:
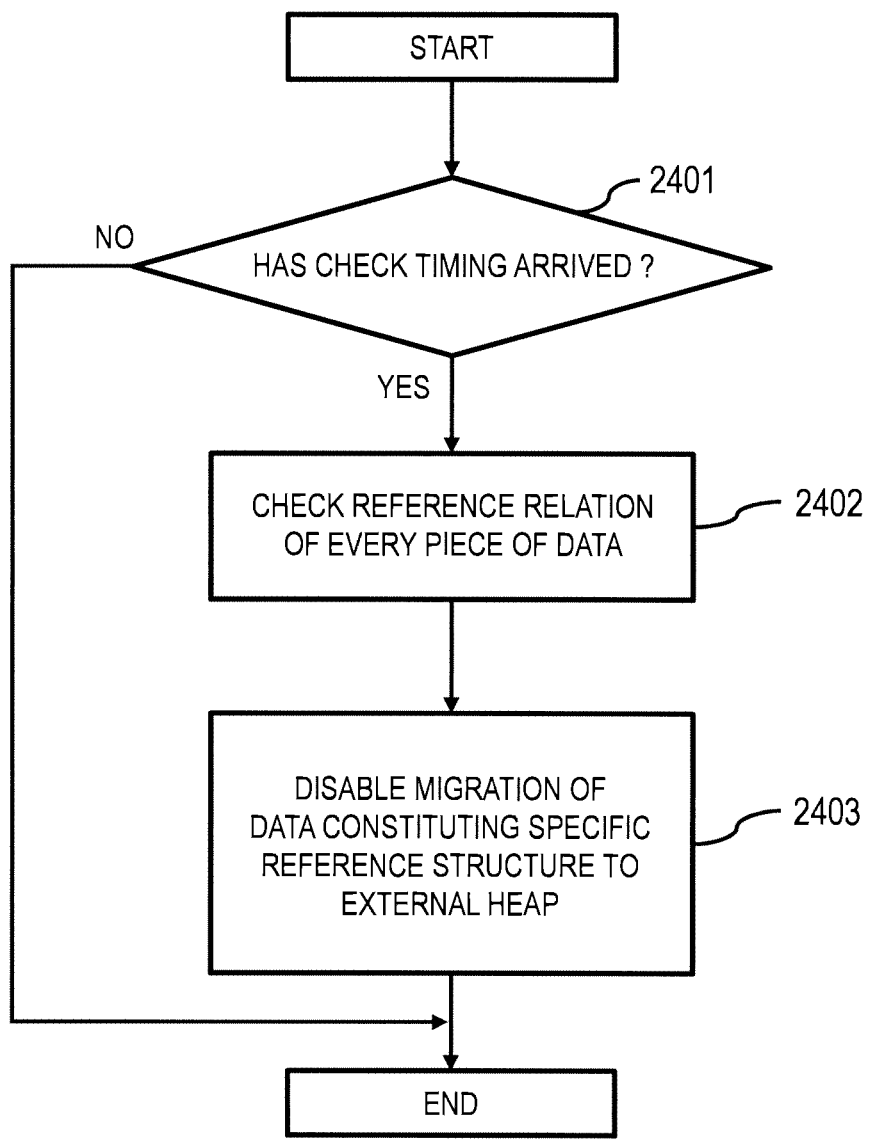
FIG. 6 is a flow chart outlining a memory management method according to the embodiment of this invention.

FIG. 6 is a flow chart outlining a memory management method according to the embodiment of this invention. The Java VM 105 executes control logic illustrated in FIG. 6.

The Java VM 105 first determines whether or not a time for checking data reference relations has arrived (2401). The check time used herein is when to start certain processing in the program which is specified with a Java program API, a startup option of the Java VM 105, an external file, or the like. The check time is described later in detail with reference to FIGS. 7A, 7B, and 8.

In the case where the check time has arrived (YES in 2401), the Java VM 105 checks reference relations of all pieces of data that are check targets (2402).

Based on the data reference relations obtained in Step 2402, in the case where a specific reference structure (circle structure, list structure, or the like) is found in a data group that can be referred to from the basic point data associated with the external heap 110, the Java VM 105 disables (prohibits) migration to the external heap 110 for all or some of pieces of data that constitute the reference structure (2403). After that, the data for which the migration is disabled in Step 2403 is processed in a manner that prevents the data from being migrated to the external heap 110 with which the basic point data is associated.

(Data Reference Relation Check Time)

Figure 7A:
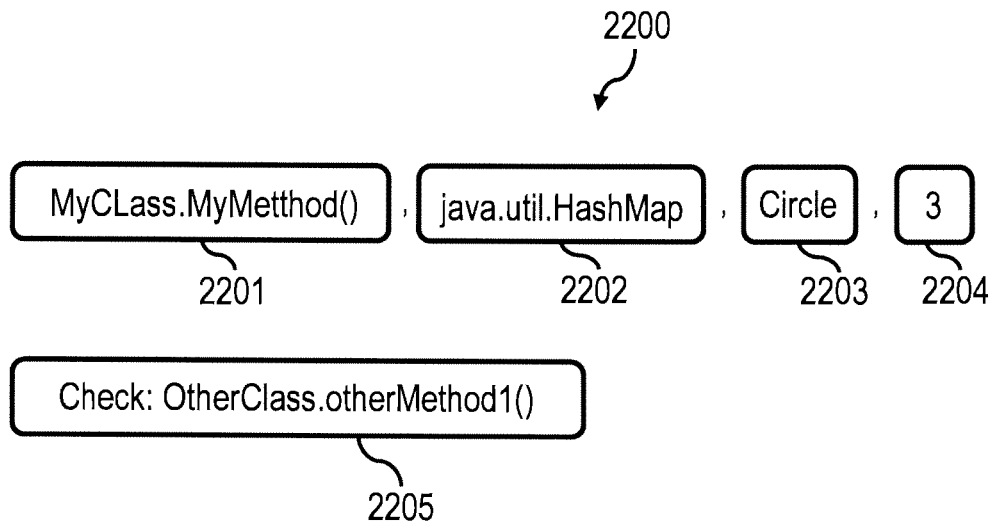
FIG. 7A is a diagram illustrating a first example in which a check time is specified with an external file according to the embodiment of this invention.
Figure 7B:
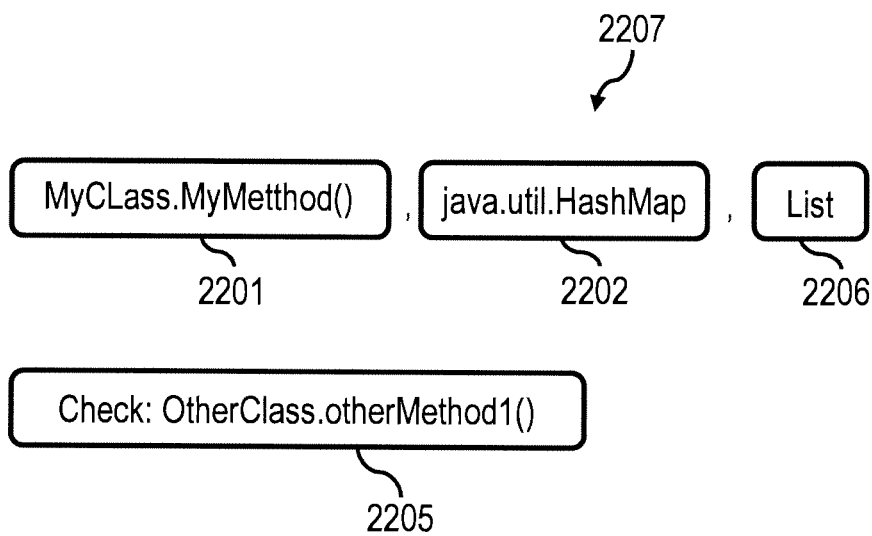
FIG. 7B is a diagram illustrating a second example in which a check time is specified with an external file according to the embodiment of this invention.

FIG. 7A is a diagram illustrating a first example in which a check time is specified with an external file 2200 according to the embodiment of this invention. FIG. 7B is a diagram illustrating a second example in which a check time is specified with an external file 2207 according to the embodiment of this invention.

FIGS. 7A and 7B illustrate the external file 2200 whose format includes the "full name of a method for generating basic point data, the affiliated class of the basic point data, and the type (and distance) of reference relation of check targets" on the first line, and a "check time" on the second line.

In FIG. 7A, a "MyClass.MyMethod" method 2201 is the full name (class name+method name) of a method for generating basic point data. A "java.util.HashMap" class 2202 is a class to which the basic point data belongs. "Circle" 2203 specifies a circle structure as the reference relation type of check targets. A numerical value "3" 2204 is the distance of a reference from the basic point data to data that can be migrated to the external heap. In the case where the numerical value 2204 is "0", the circle structure data is prevented from being migrated to the external heap. A method 2205 indicates a time for checking data reference relations specified in the steps 2201 to 2204. In FIG. 7A, the time when the method is executed is specified as the check time. The check time may be specified with a sentence in the program. In FIG. 7B, "List" 2206 specifies a list structure as the reference relation type of check targets.

Figure 8:
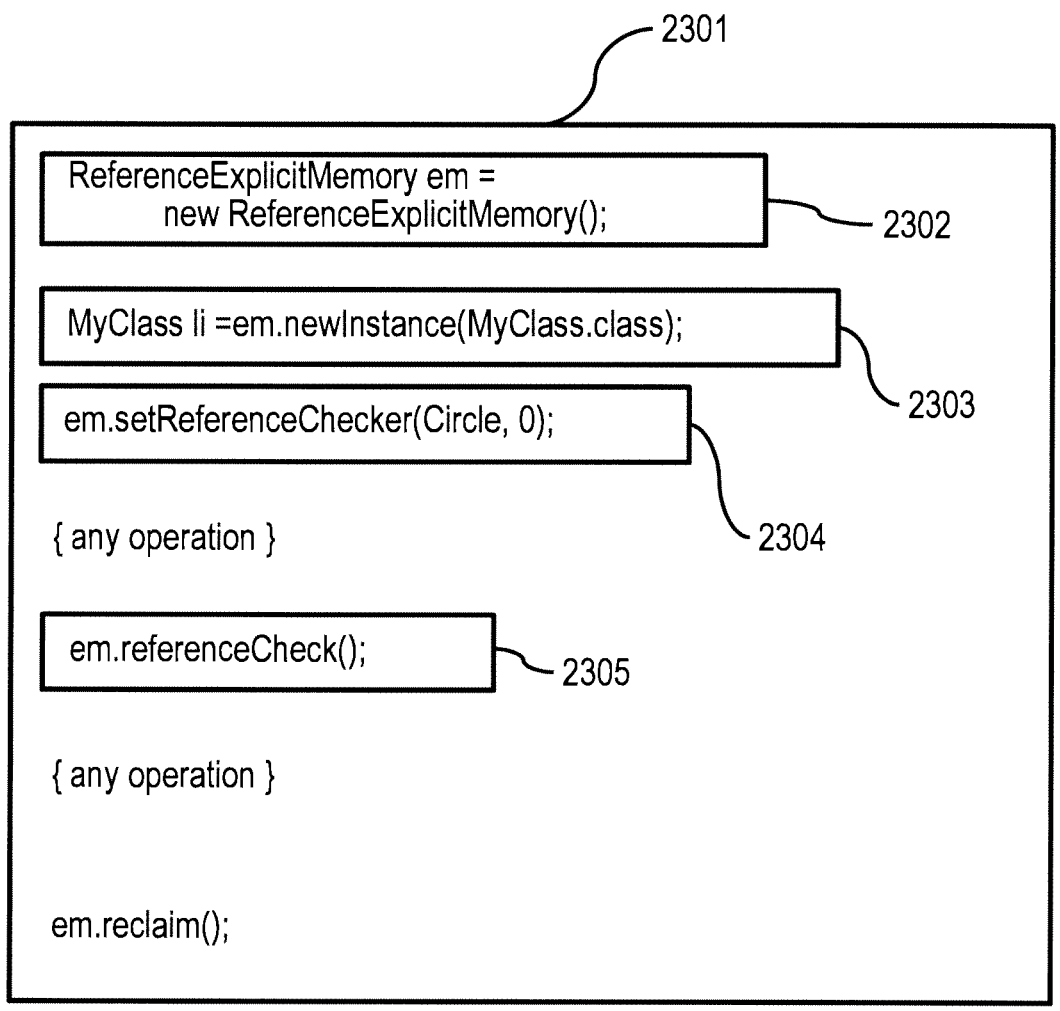
FIG. 8 is a diagram illustrating an example in which a check time is specified with a Java program API according to the embodiment of this invention.

FIG. 8 is a diagram illustrating an example in which a check time is specified with a Java program API according to the embodiment of this invention. In FIG. 8, the information of FIG. 7A is specified with a Java program API.

A Java program 2301 in FIG. 8 includes a step 2302 of generating an external heap, a step 2303 of generating basic point data (an instance of "MyClass") in the generated external heap, a step 2304 of specifying the reference relation type of check targets, and a step 2305 of actually giving an instruction to check by calling up a "referenceCheck" method. A first argument "Circle" and second argument "0" of the step 2304 are respectively synonymous with the "Circle" 2203 and numerical value 2204 of FIG. 7A.

Based on the external file 2200 of FIG. 7A, the external file of FIG. 7B, or the Java program API of FIG. 8, the Java VM 105 checks specified data reference relations at a specified time. The check should be performed on an appropriately specified place that would not affect the execution of the Java program significantly. This is to enhance the practicality of the reference relation check which is expected to take long.

Examples of reference relations of check targets include a circle structure and a list structure.

In the case where reference relations of check targets have a circle structure, a reference relation and the depth of the reference are checked first for every piece of data. Next, in the case where the relation of a reference from basic point data is circular, it is determined which data among data that can be referred to from the basic point data is kept from being migrated to an external heap. A "migration to the external heap memory disabled" flag is then attached to the affiliated class of the data that has been determined as data prohibited from being migrated. A data group belonging to a class to which the "migration disabled" flag is attached is prohibited from being migrated to an external heap.

In the case where reference relations of check targets have a list structure, on the other hand, references from basic point data are checked first. Next, it is determined whether or not data belonging to the same class as that of the basic point data is found among data that can be referred to from the basic point data. In the case where it is determined that there is data belonging to the same class as that of the basic point data, a "migration to the external heap disabled" flag is attached to this affiliated class. This "migration disabled" flag is synonymous with the flag used when reference relations of check targets have a circle structure.

(Control Logic Used for a Circle Structure)

Figure 9:
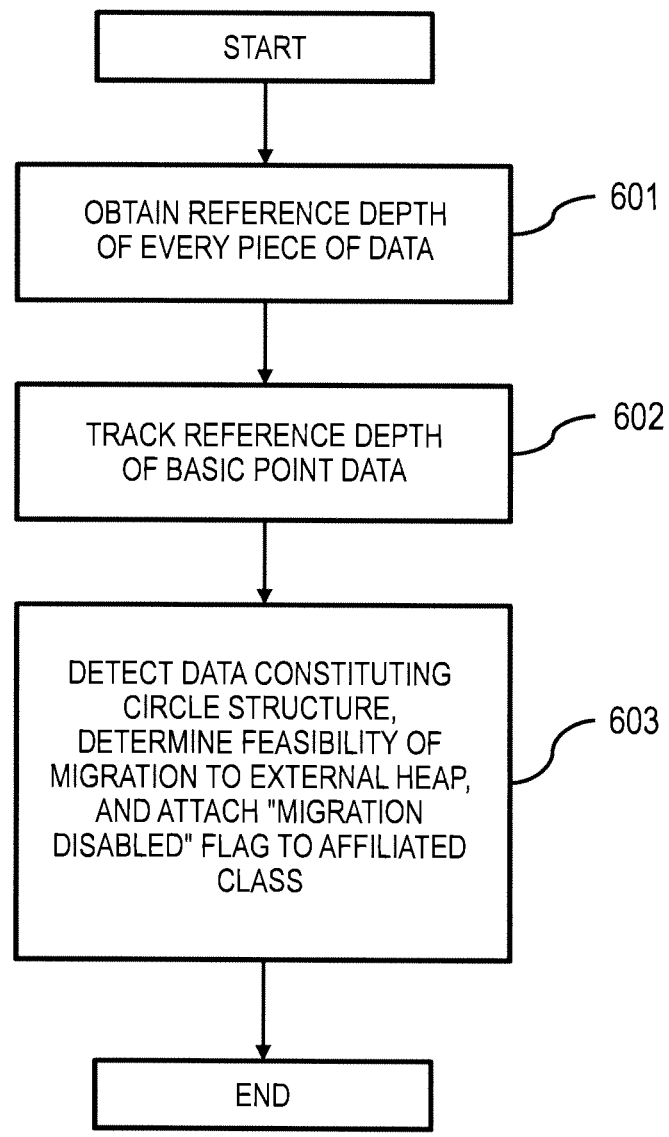
FIG. 9 is a flow chart illustrating control logic of a data migration feasibility determining module and a data migrating module according to the embodiment of this invention.

FIG. 9 is a flow chart illustrating control logic of the data migration feasibility determining module 107 and the data migrating module 108 according to the embodiment of this invention. Steps 601 and 602 of FIG. 9 correspond to Step 2402 of FIG. 6. Step 603 corresponds to Step 2403 of FIG. 6.

First, the data reference relation tracking module 106 obtains a reference depth for every piece of data (601). The data reference relation tracking module 106 here tracks reference relations that data has at the time the processing is started, obtains a reference depth for every piece of data based on the tracked data reference relations, and attaches the reference depth to the piece of data. The reference depth is the distance from a GC root set, namely, the number of references traced from the GC root set. A concrete description on the processing of Step 601 is given later with reference to FIGS. 10 and 11.

Next, out of reference depths of all pieces of data obtained in Step 601, the data reference relation tracking module 106 tracks the reference depth of basic point data associated with an external heap (602).

After that, the data migration feasibility determining module 107 compares the reference depth of the basic point data tracked in Step 602 and the reference depth of data that can be referred to from the basic point data to detect data that constitutes a circle structure. The data migration feasibility determining module 107 also determines whether or not the detected data can be migrated to the external heap. The data migration feasibility determining module 107 further attaches the "migration to the external heap disabled" flag to the affiliated class of data determined as data that should be kept from being migrated (603). A concrete description on the processing of Step 603 is given later with reference to FIGS. 12 and 13.

The processing steps of FIG. 9 are described in detail below. Before the description on the processing steps of FIG. 9 is given, pieces of data having a circle structure are described.

Figure 10:
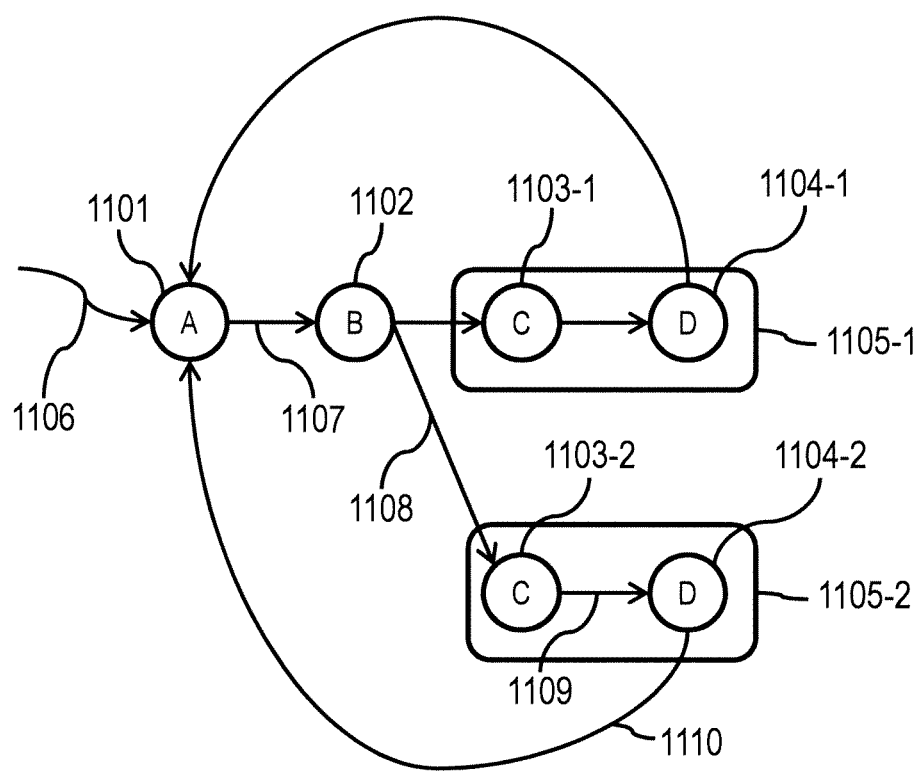
FIG. 10 is a diagram illustrating an example of a circle structure reference relation among pieces of data.

FIG. 10 is a diagram illustrating an example of a circle structure reference relation among pieces of data. In FIG. 10, a circular mark represents data, an alphabet letter inside the circular mark represents the affiliated class of the data, and an arrow represents a reference relation between pieces of data. For example, the reference 1107 indicates that the data 1101 whose affiliated class is A refers to the data 1102 whose affiliated class is B. The reference source of a reference 1106 is a GC root set. The GC root set is data (objects) that is the start point in tracing data reference relations in GC. The GC root set is defined in a register within the CPU 102, a stack frame generated in the process of executing the Java program 104, a program that constitutes the Java VM 105 itself, or the like.

Figure 11:
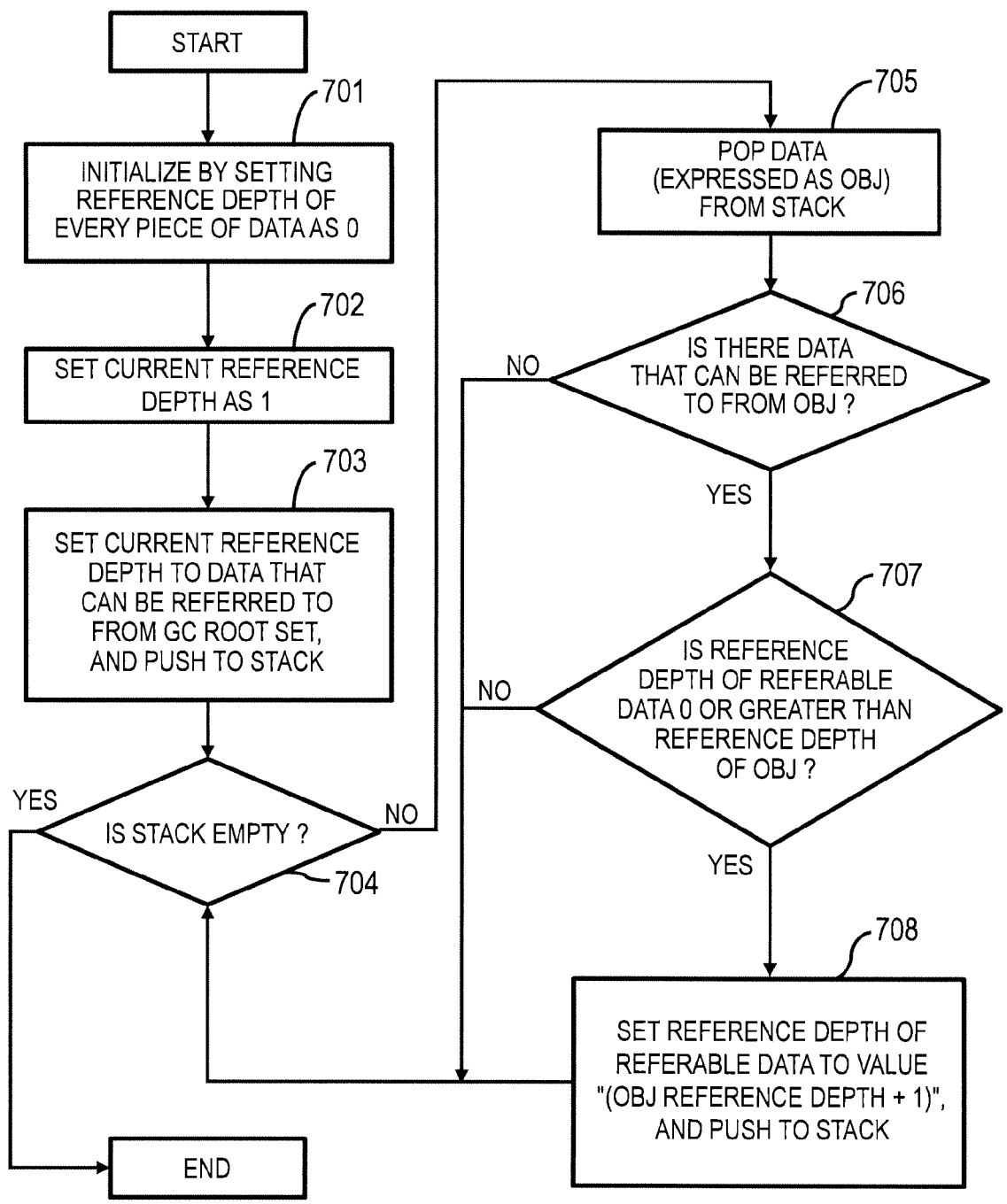
FIG. 11 is a flow chart illustrating control logic for checking depths of circle structure data references according to the embodiment of this invention.

FIG. 11 is a flow chart illustrating control logic for checking the depths of circle structure data references according to the embodiment of this invention. The control logic of FIG. 11 corresponds to Step 601 of FIG. 9.

First, the data reference relation tracking module 106 initializes by setting the reference depth of every piece of data as 0 (701). Next, the data reference relation tracking module 106 sets the current reference depth as 1 (702). After that, the data reference relation tracking module 106 sets the current reference depth, 1, to data that can be referred to from the GC root set, and pushes this data to a stack (703). The stack here has a general first-in-last-out data structure. Adding data to a stack is called "push" and taking data out of a stack is called "pop". In the example of FIG. 10, the reference depth "1" is set to the data 1101, which can be referred to from the GC root set, and the data 1101 is pushed to the stack.

The data reference relation tracking module 106 then determines whether or not the stack is empty (704). In the case where the stack is empty (YES in 704), the processing is ended. In the case where the stack is not empty (NO in 704), on the other hand, one piece of data is popped out of the stack (705). In the example of FIG. 10, the data 1101 is popped. The data popped in Step 705 is referred to as "Obj" in the following description.

After that, the data reference relation tracking module 106 determines whether or not there is data that can be referred to from the data Obj popped in Step 705 (706). In the example of FIG. 10, the data 1102 can be referred to from the data 1101 and the processing therefore proceeds to Step 707.

In Step 707, the data reference relation tracking module 106 determines whether or not at least one of conditions (1) that the reference depth of the data detected in Step 706 is 0

(the initial state) and (2) that the reference depth of the data detected in Step 706 is greater than the reference depth of the data Obj popped in Step 705, is satisfied (707). In the example of FIG. 10, the data 1102 has a reference depth of 0 (the initial state) and satisfies the condition (1), and the processing therefore proceeds to Step 708.

In Step 708, the data reference relation tracking module 106 sets, to the reference depth of the data detected in Step 706, a value obtained by adding 1 to the reference depth value of the data Obj popped in Step 705, and pushes the data detected in Step 706 to the stack (708). In the example of FIG. 10, 2 is set to the reference depth of the data 1102. The processing then returns to Step 704.

The processing from Steps 704 to 708 is subsequently repeated until the stack is emptied. The processing of Step 708 is thus executed only once for every piece of data that can be referred to from the GC root set. In the example of FIG. 10, 3 is set to the reference depths of the data 1103-1 and data 1103-2 which can be referred to from the data 1102 (see FIGS. 12), and 4 is set to the reference depths of the data 1104-1 and data 1104-2 which can be referred to from the data 1103-1 and the data 1103-2 (see FIG. 12). The reference depth of the data 1101 which can be referred to from the data 1104-1 and the data 1104-2 is set to 1, which is less than the reference depth "4" of the data 1104 popped in Step 705 (NO in 707), and neither of the conditions (1) and (2) given above is satisfied. The processing therefore moves to Step 704. After that, because the stack is empty (YES in 704), the processing is ended.

Figure 12:
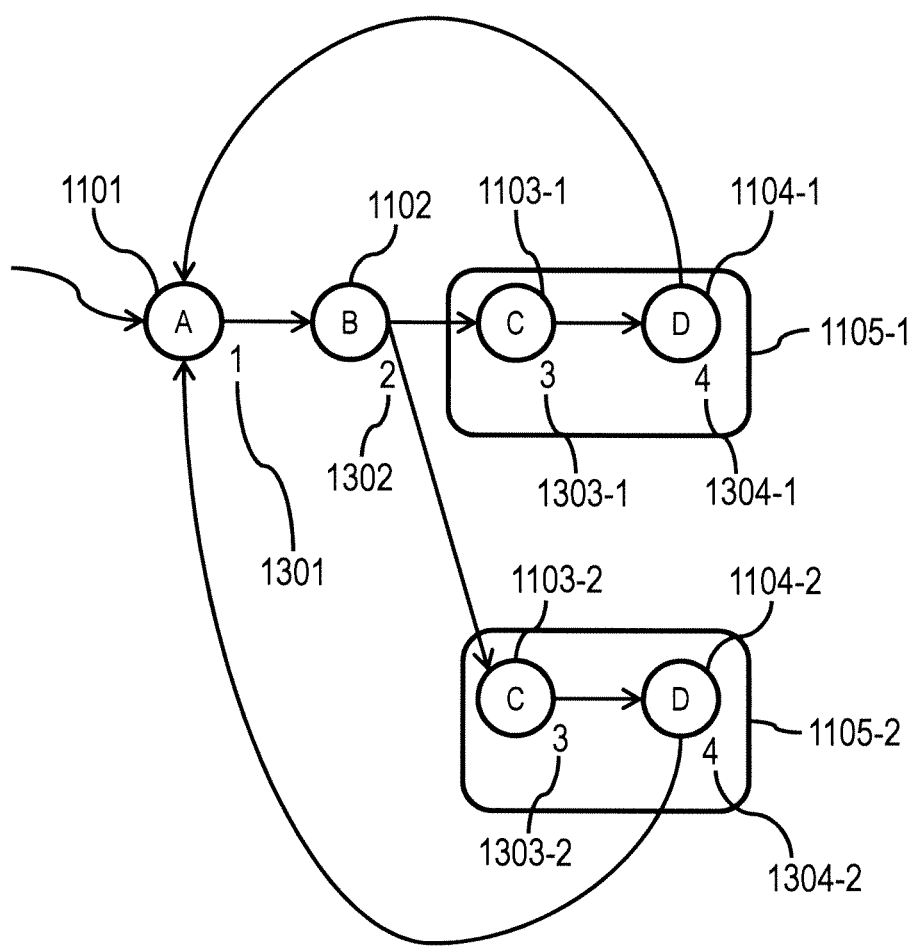
FIG. 12 is a diagram illustrating results of obtaining the depths of circle structure data references according to the embodiment of this invention.

FIG. 12 is a diagram illustrating results of obtaining the depths of circle structure data references according to the embodiment of this invention. In FIG. 12, a depth 1301 indicates a numerical value 1, which is the reference depth of the data 1101. Similarly, depths 1302, 1303-1 (2), and 1304-1 (2) respectively indicate numerical values 2, 3, and 4, which are the reference depths of the data 1102, the data 1103-1 (2), and the data 1104-1 (2).

Step 602 of FIG. 9 is described next.

The data reference relation tracking module 106 tracks the reference depth of the basic point data (602). In the example of FIG. 10, when data within an enclosure 1105-1 and data within an enclosure 1105-2 are to be placed in different external heaps, the data 1103-1 and the data 1103-2 each serve as basic point data. The reference depths of the data 1103-1 and the data 1103-2 are 3 (see FIG. 13).

Step 603 of FIG. 9 is described next.

Figure 13:
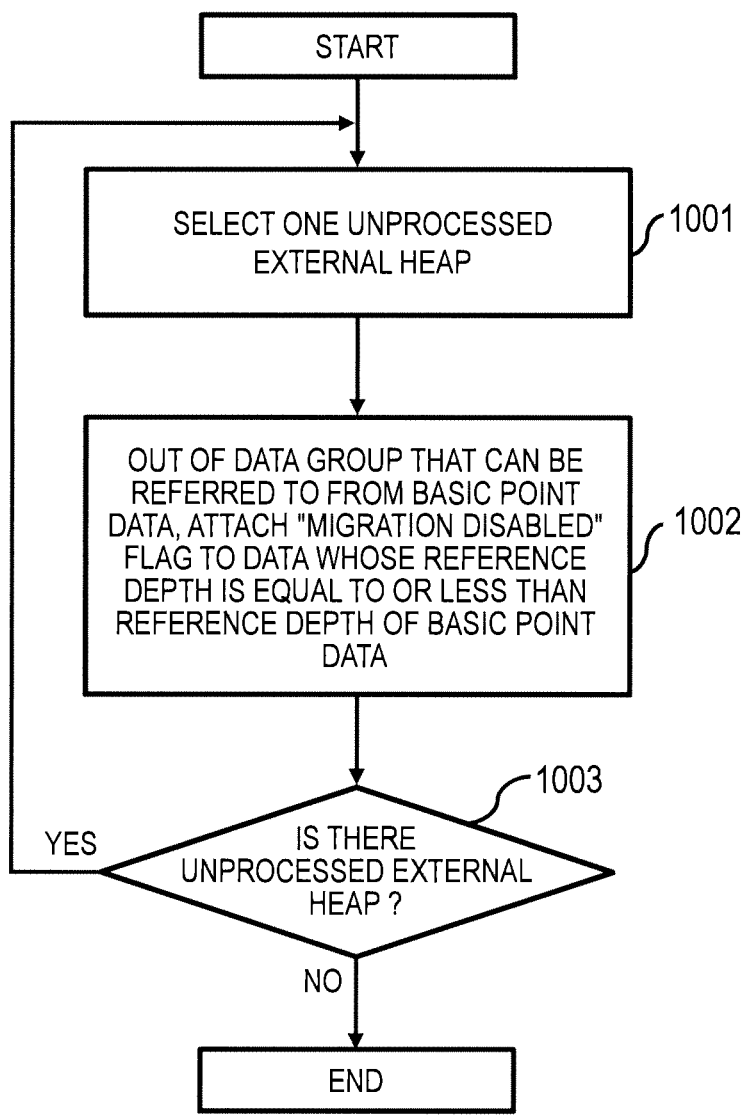
FIG. 13 is a flow chart illustrating control logic for determining migration feasibility of circle structure data based on a reference depth of data according to the embodiment of this invention.

FIG. 13 is a flow chart illustrating control logic for determining the migration feasibility of circle structure data based on the reference depth of the data according to the embodiment of this invention. The control logic of FIG. 13 corresponds to Step 603 of FIG. 9.

First, the data migration feasibility determining module 107 selects one external heap that has not been processed (1001). In the example of FIG. 12, an external heap corresponding to the enclosure 1105-1 is selected.

Next, out of data that can be referred to from basic point data that is associated with the external heap selected in Step 1001, the data migration feasibility determining module 107 obtains data whose reference depth is equal to or less than the reference depth of the basic point data, and attaches a "migration disabled" flag indicating that the migration to the external heap is prohibited to the affiliated class of the obtained data (1002). In the example of FIG. 12, out of the data 1104-1, the data 1101, and the data 1102 which can be referred to from the basic point data 1103-1 within the enclosure 1105-1, the data 1101 (reference depth: 1) and the data 1102 (reference depth: 2) are obtained as data whose reference depth is equal to or less than the reference depth "3" of the basic point data 1103-1, and the "migration disabled" flag is attached to the class A and the class B to which the data 1101 and the data 1102 belong respectively.

Figure 14:
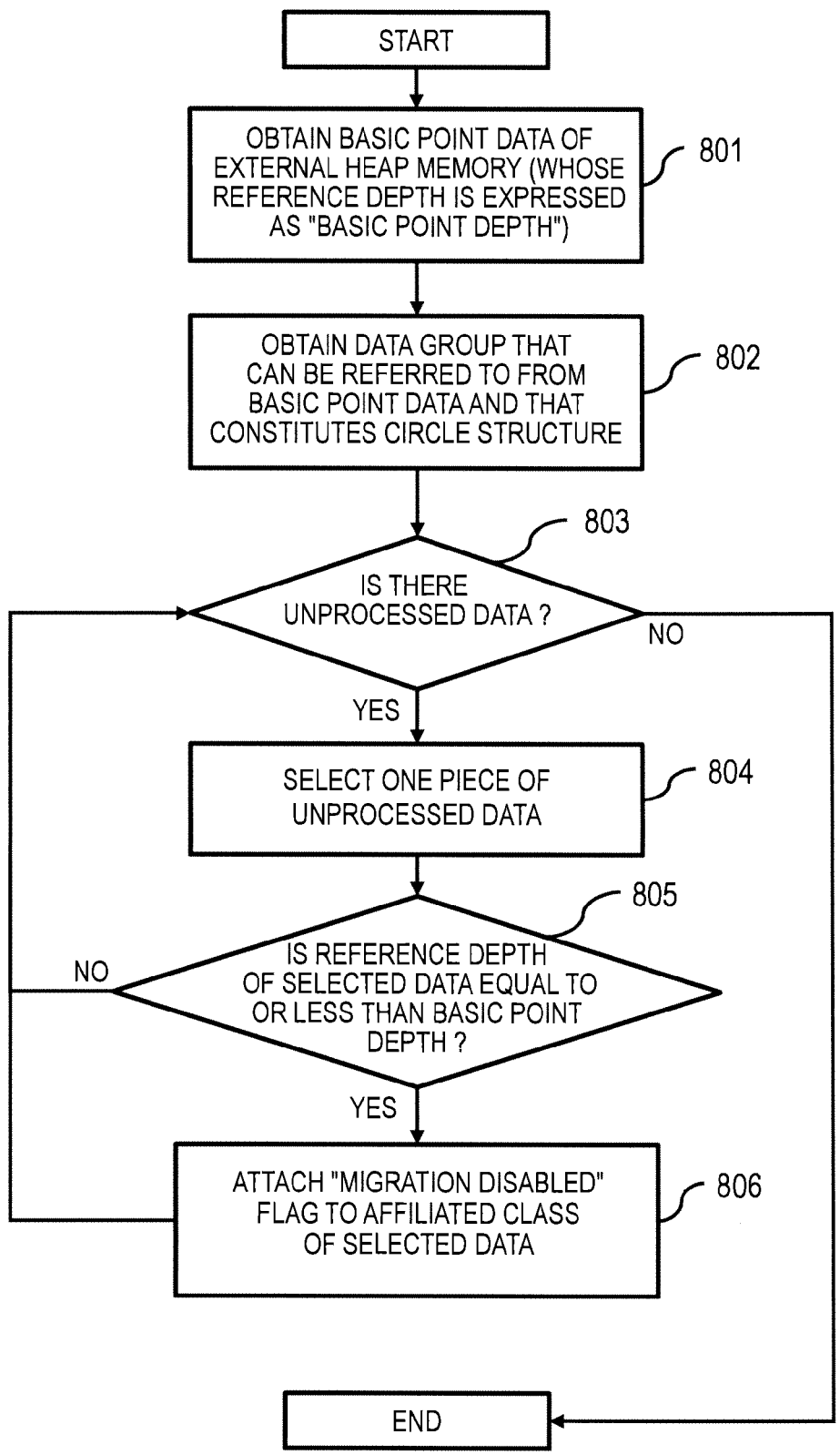
FIG. 14 is a flow chart illustrating detailed processing of Step 1002 of FIG. 13.

FIG. 14 is a flow chart illustrating detailed processing of Step 1002 of FIG. 13.

First, the data migration feasibility determining module 107 obtains basic point data that is associated with the external heap selected in Step 1001 (801). In the example of FIG. 12, the basic point data 1103-1 is obtained. In the following description, the reference depth of the basic point data obtained in this step is referred to as "basic point depth".

Next, the data migration feasibility determining module 107 obtains data that can be referred to from the basic point data and that constitutes a circle structure with the basic point data (802). In the example of FIG. 12, the data 1104-1, the data 1101, and the data 1102 which can be referred to from the basic point data 1103-1 are obtained. The basic point data 1103-2 of the other external heap and the data 1104-2 which can be referred to from this data are not obtained.

In the case where the pieces of data obtained in Step 802 include unprocessed data on which Step 804 and the subsequent steps have not been performed (YES in 803), the data migration feasibility determining module 107 selects one piece of unprocessed data from the data set (804).

The data migration feasibility determining module 107 then compares the reference depth of the data selected in Step 804 against the basic point depth (805). In the case where the reference depth of the data selected in Step 804 is equal to or less than the basic point depth (YES in 805), the processing proceeds to Step 806.

In Step 806, the data migration feasibility determining module 107 attaches a "migration to the external heap disabled" flag to the affiliated class of the data whose reference depth is equal to or less than the basic point depth (806). In the example of FIG. 12, the data 1101 (reference depth: 1) and the data 1102 (reference depth: 2) have reference depths equal to or less than the reference depth "3" of the basic point data 1103-1, and the "migration disabled" flag is attached to the class A and the class B to which the data 1101 and the data 1102 belong respectively. The attached "migration disabled" flag is used in migration processing (see FIG. 15) of the data migrating module 108. Step 805 described above is processing for preventing Step 806 from being applied to every piece of data obtained in Step 802.

Returning to FIG. 13, the data migration feasibility determining module 107 determines whether or not there is an external heap that has not been processed (1003). In the case where there is an unprocessed external heap (YES in 1003), the processing returns to Step 1001. In the case where there is no unprocessed external heap (NO in 1003), the processing is ended.

Figure 15:
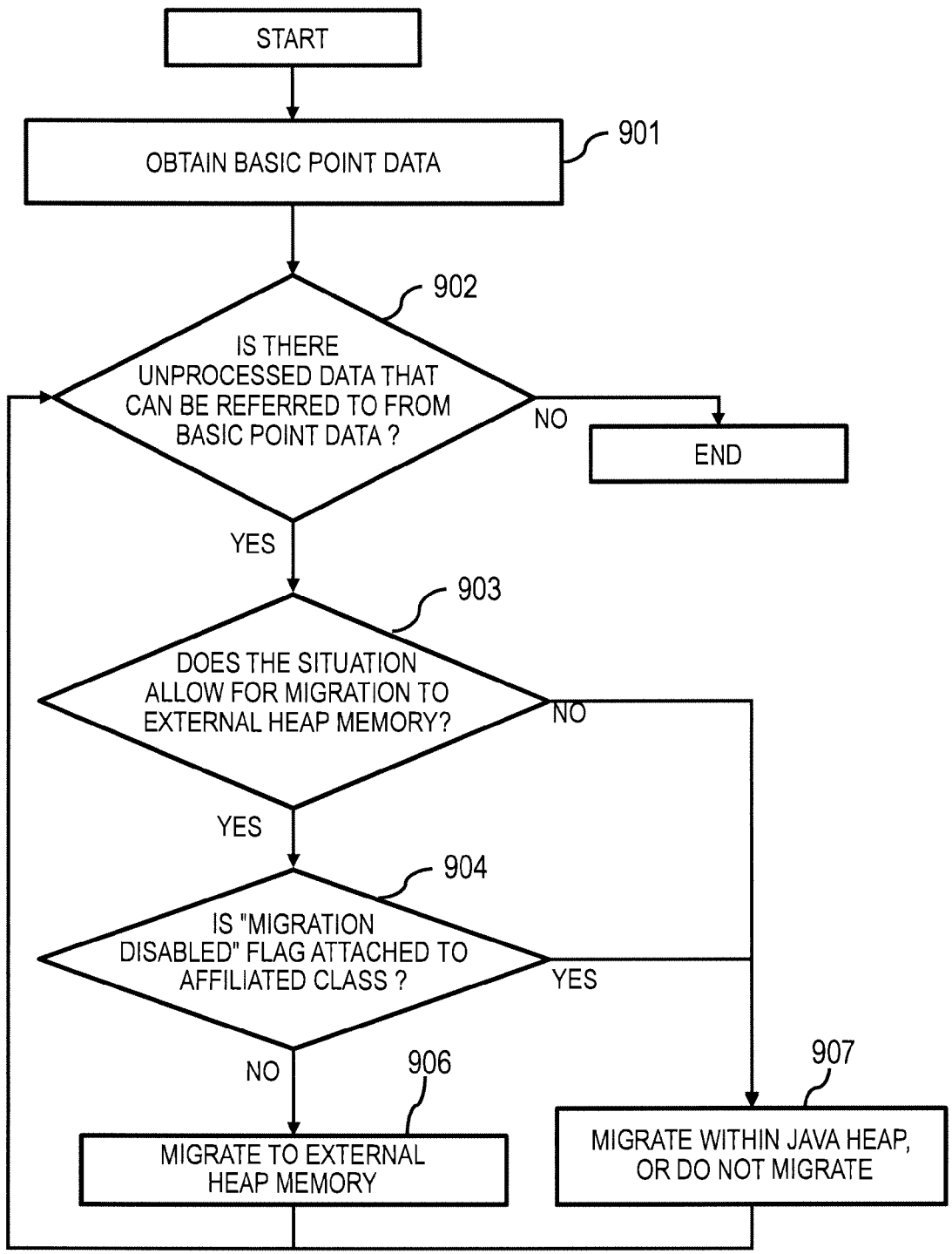
FIG. 15 is a flow chart illustrating control logic for data migration according to the embodiment of this invention.

FIG. 15 is a flow chart illustrating control logic for data migration according to the embodiment of this invention. The data migrating module 108 of FIG. 5 uses the "migration disabled" flag described above to migrate only data that should be migrated to an external heap.

First, the data migrating module 108 obtains basic point data of an external heap that is the migration destination (901). In the example of FIG. 12, when the migration destination external heap is an external heap that corresponds to the enclosure 1105-1, the basic point data 1103-1 is obtained.

Next, the data migrating module 108 checks whether or not there is data that can be referred to from the basic point data and that has not been processed (902). In the example of FIG. 12, the data 1104-1 satisfies the criteria (YES in 902) and the processing therefore proceeds to Step 903. The data 1101 and the data 1102, which belong to classes with the "migration disabled" flag attached thereto, and the data 1103-2 and the data 1104-2, which are within the other external heap, are not counted as data that can be referred to from the basic point data 1103-1.

In Step 903, the data migrating module 108 checks whether or not the situation allows for the migration to the external heap (903). In the case of data migration to an external heap during GC, the situation allows for the migration when the migration count of GC within the Java heap exceeds a given value, when the consumed amount of the Java heap exceeds a given value, or the like.

In Step 904, the data migrating module 108 checks whether or not the "migration disabled" flag is attached to the affiliated class of the data found in Step 902 (904).

In the case where the answer to Step 903 is "YES" and the answer to Step 904 is "NO", the data migrating module 108 actually migrates the data to the external heap (906). In the example of FIG. 12, the data 1104-1 is migrated to the external heap that corresponds to the enclosure 1105-1.

In the case where the answer to Step 903 is "NO" or the answer to Step 904 is "YES", on the other hand, the data migrating module 108 migrates the data within the Java heap when data is to be migrated to an external heap during GC. Otherwise, the data migrating module 108 does not migrate the data (907). In Step 907, the data migrating module 108 makes sure that, although the data is not migrated to the external heap, at least the normal execution of the program is possible.

Subsequently, the processing from Steps 903 to 907 is repeated for every piece of unprocessed data obtained in Step 902.

Figure 16:
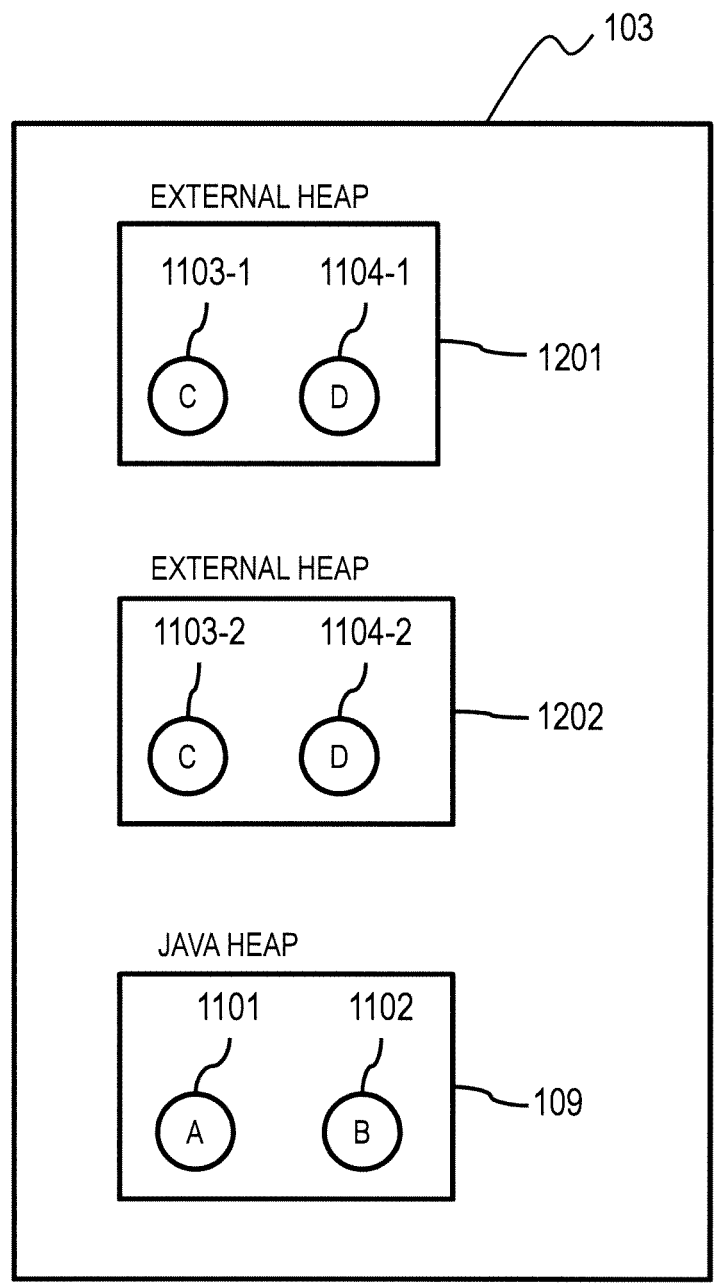
FIG. 16 is a diagram illustrating how data is placed when the embodiment of this invention is applied to the circle structure data of FIG. 10.

FIG. 16 is a diagram illustrating how data is placed when this invention is applied to the circle structure data of FIG. 10. A data group that has the data 1103-1 as the basic point data is placed in an external heap 1201. Similarly, a data group that has the data 1103-2 as the basic point data is placed in an external heap 1202 different from the external heap 1201. The data 1101 and the data 1102 to which the "migration disabled" flag is attached are not migrated and are placed in the Java heap 109.

Figure 17:
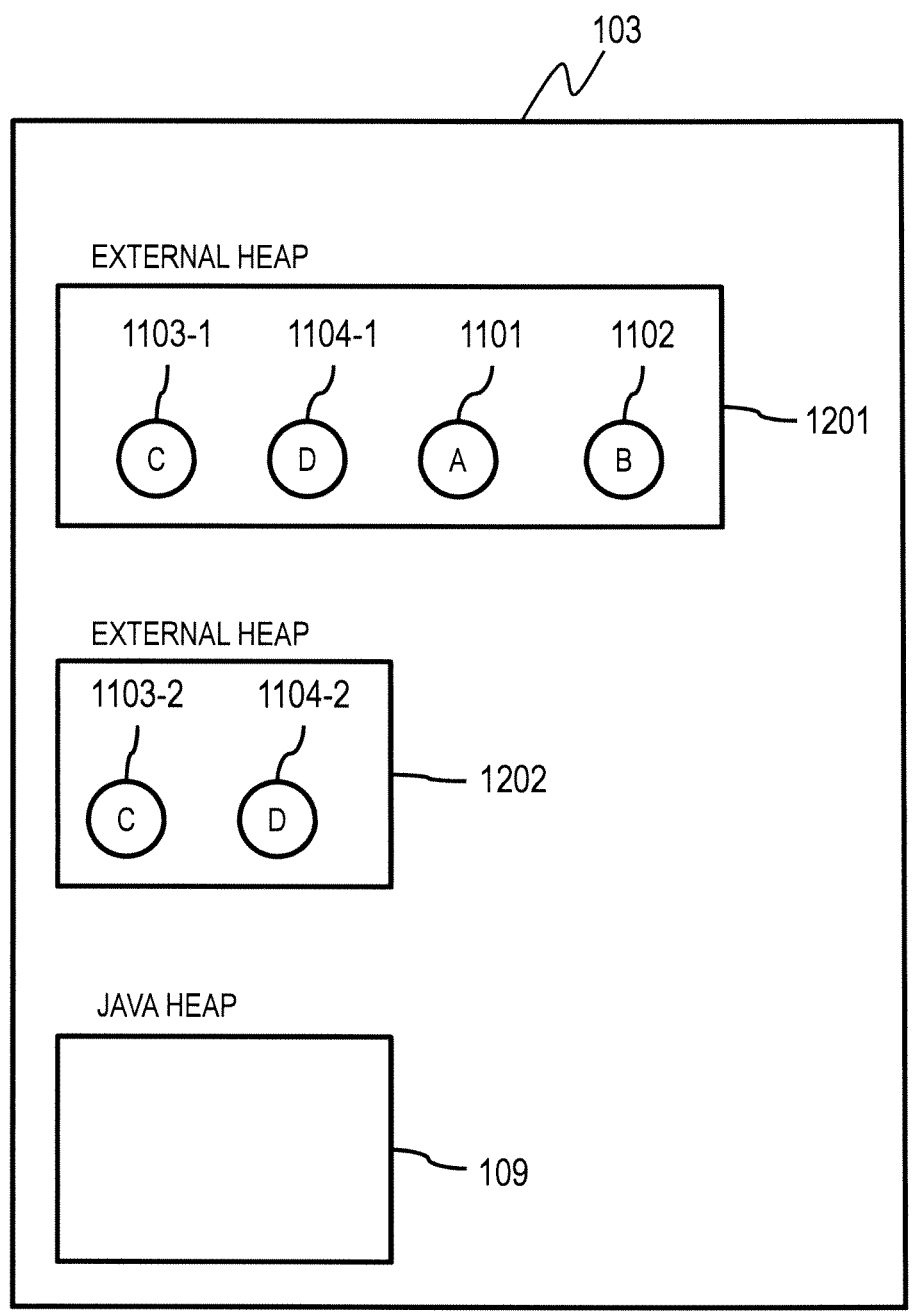
FIG. 17 is a diagram illustrating how data is placed when a conventional data placement method is applied to the circle structure data of FIG. 10.

FIG. 17 is a diagram illustrating how data is placed when a conventional data placement method is applied to the circle structure data of FIG. 10. The data 1101 and the data 1102 which are not supposed to be migrated to the external heap 1201 are placed in the external heap 1201.

This gives rise to such problems as the difficulty in estimating the consumed amount of the external heap and a large difference among external heaps in terms of the period of time in which an external heap is kept allocated. In other words, these problems are solved by applying this invention and employing the data placement of FIG. 16.

(Modification Example of the Control Logic Used for a Circle Structure)

A modification example of the control logic used for a circle structure is described next. In the control logic described above, whether or not migration to an external heap is possible is determined based on the reference depth of data (the number of references traced from the GC root set) (see Step 1002 of FIG. 13). Here, whether or not migration to an external heap is possible is determined based on the distance of data (the number of references traced from basic point data), instead of the reference depth of the data.

Figure 18:
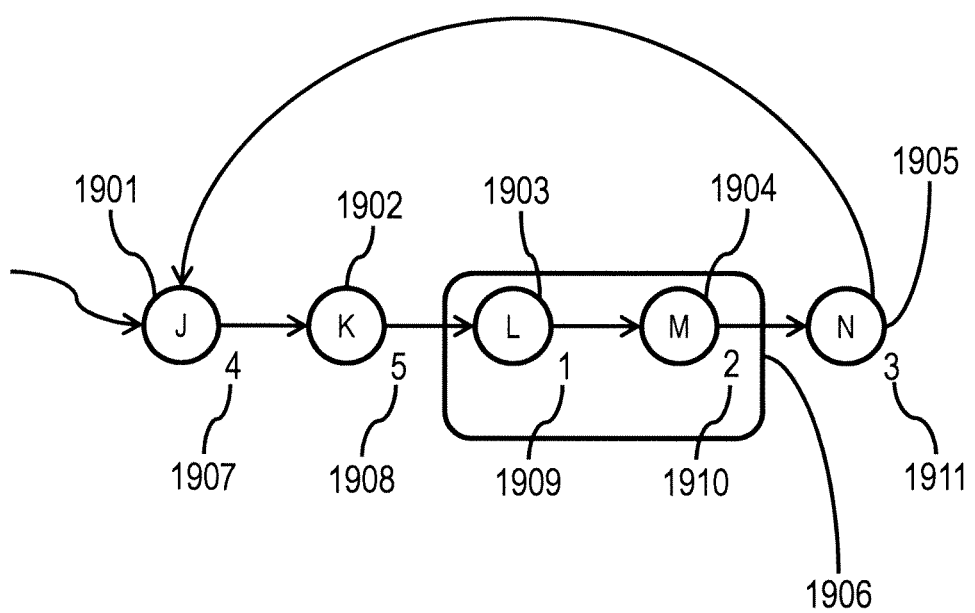
FIG. 18 is a diagram illustrating another example of a circle structure reference relation among pieces of data.

FIG. 18 is a diagram illustrating another example of a circle structure reference relation among pieces of data. In the example of FIG. 18, only basic point data 1903 and data 1904 within an enclosure 1906 are pieces of data that should be placed in the same external heap. Distances 1907, 1908, 1909, 1910, and 1911 respectively indicate values 4, 5, 1, 2, and 3 of reference distances from the basic point data 1903 to data 1901, data 1902, the data 1903, the data 1904, and data 1905.

Figure 19:
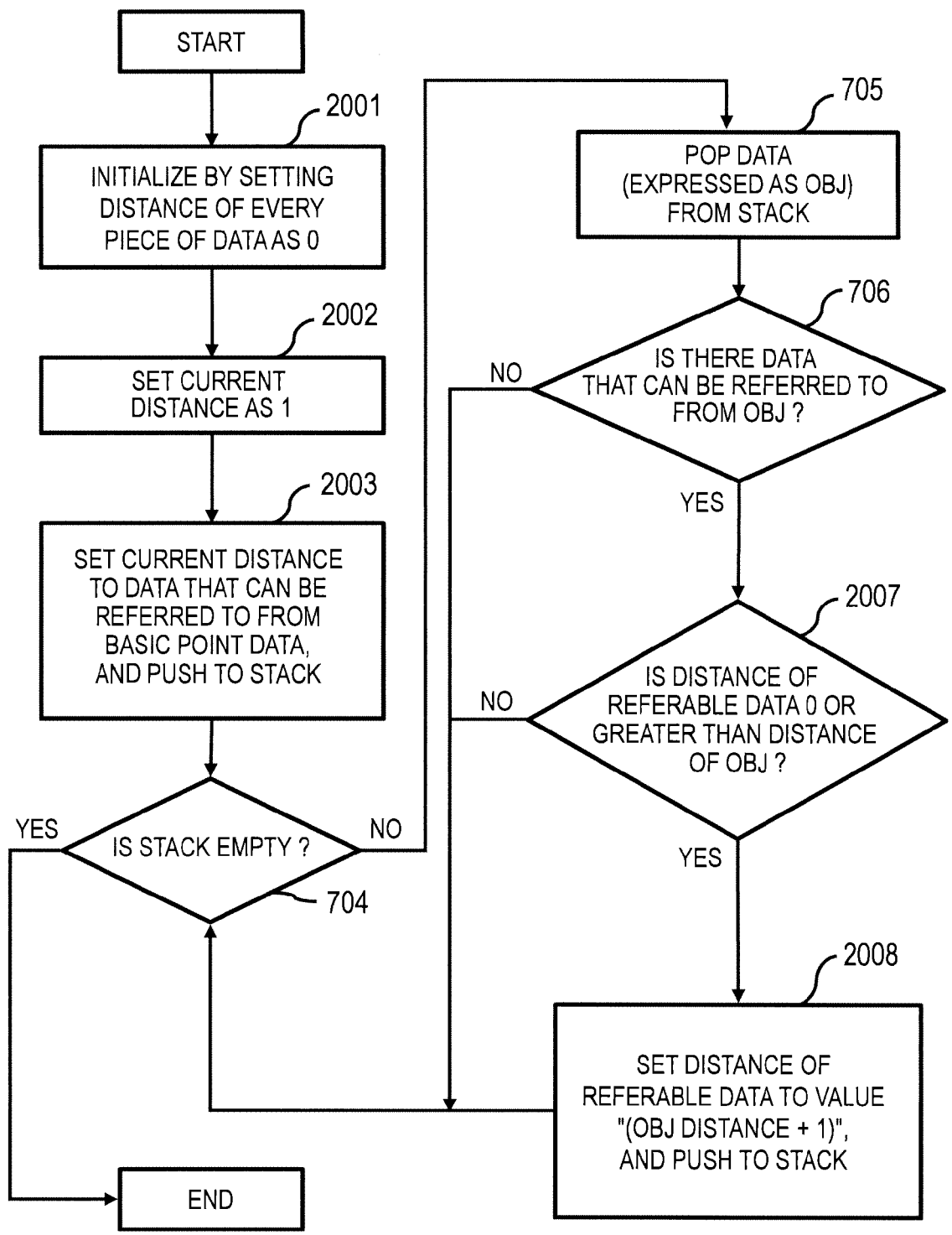
FIG. 19 is a flow chart illustrating control logic for checking a distance of circle structure data according to the embodiment of this invention.

FIG. 19 is a flow chart illustrating control logic for checking the distance of circle structure data according to the embodiment of this invention. FIG. 19 is obtained by replacing Steps 701 to 703, 707, and 708 of FIG. 11 with Steps 2001 to 2003, 2007, and 2008, respectively. The following description uses the same symbols for steps that have the same functions as in FIG. 11, in order to omit a repetitive description. The control logic of FIG. 19 corresponds to Step 601 of FIG. 9.

In Step 2001, the data reference relation tracking module 106 performs initialization by setting, as 0, the reference distance from basic point data, namely, the number of references traced from the basic point data (hereinafter, referred to as "distance") for every piece of data (2001). The data reference relation tracking module 106 next sets the current distance as 1 (2002). In the example of FIG. 18, 1 is set to the distance of the basic point data 1903. After that, the data reference relation tracking module 106 sets the current distance, 1, to a data that can be referred to from the basic point data, and pushes this data to a stack (2003).

In Step 2007, the data reference relation tracking module 106 determines whether or not at least one of conditions (1) that the distance of the data detected in Step 706 is 0 (the initial state) and (2) that the distance of the data detected in Step 706 is greater than the distance of the data popped in Step 705, is satisfied (2007). In Step 2008, the data reference relation tracking module 106 sets, to the distance of the data detected in Step 706, a value obtained by adding 1 to the distance value of the data Obj popped in Step 705, and pushes the data detected in Step 706 to the stack (2008).

Subsequently, the processing from Steps 704 to 2008 is repeated until the stack is emptied. In the example of FIG. 18, a numerical value 1 is set to the distance of the basic point data 1903. Numerical values 2, 3, 4, and 5 are respectively set to the distances of the data 1904, the data 1905, the data 1901, and the data 1902 which can be referred to from the basic point data 1903. The distance of the data 1903 which can be referred to from the data 1902 is set as 1, which is less than the distance "5" of the data 1902 popped in Step 705 (NO in 2007), and does not satisfy the conditions described above. The processing therefore moves to Step 704. After that, because the stack is empty (YES in 704), the processing is ended.

Figure 20:
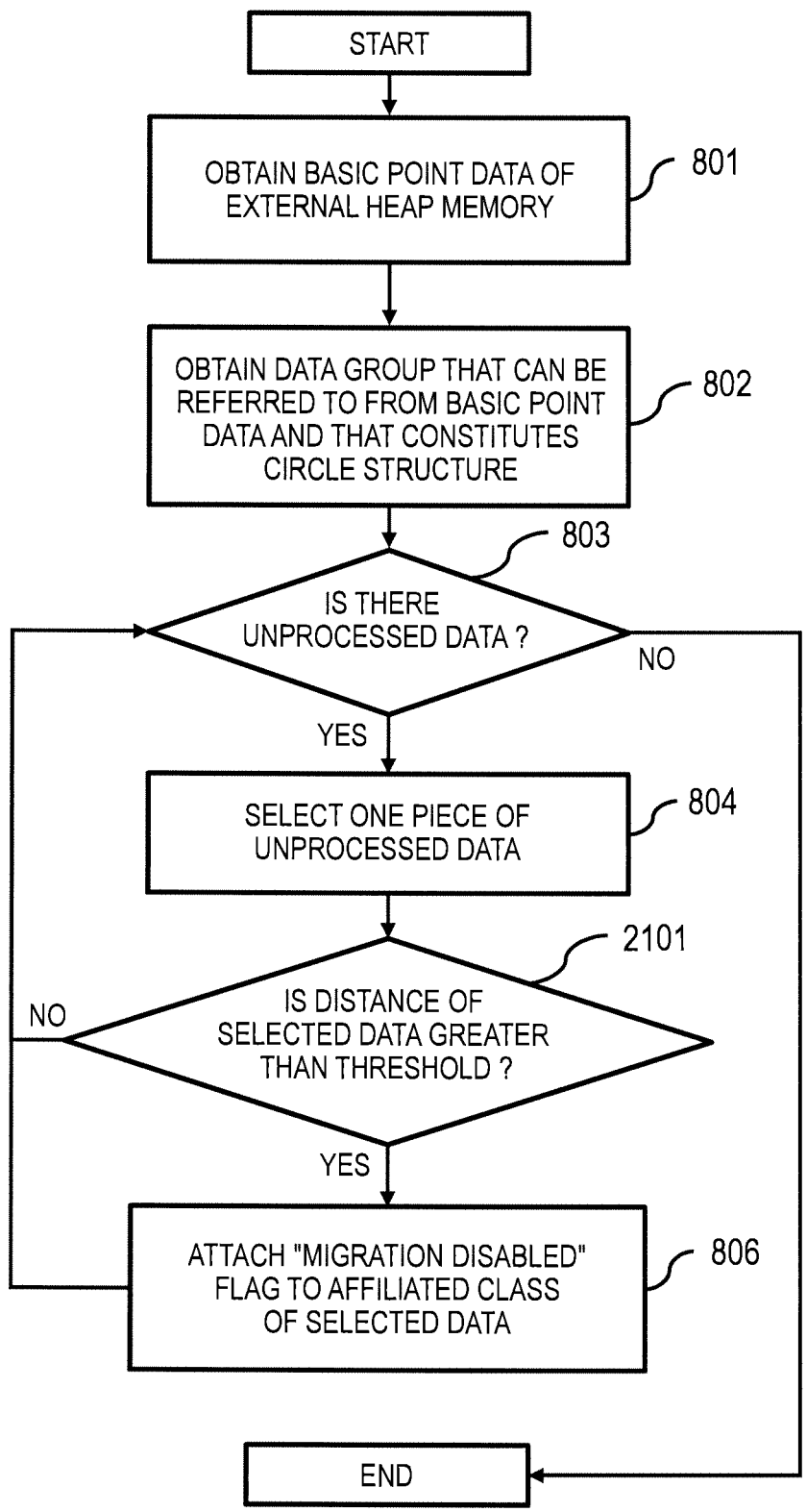
FIG. 20 is a flow chart illustrating control logic for determining the migration feasibility of circle structure data based on the distance of the data according to the embodiment of this invention.

FIG. 20 is a flow chart illustrating control logic for determining the migration feasibility of circle structure data based on the distance of the data according to the embodiment of this invention. FIG. 20 is obtained by replacing Step 805 of FIG. 14 with Step 2101. The following description uses the same symbols for steps that have the same functions as in FIG. 14, in order to omit a repetitive description. The control logic of FIG. 20 corresponds to Step 1002 of FIG. 13.

In Step 2101, the data migration feasibility determining module 107 compares the distance of the data selected in Step 804 against a given threshold (for example, 2) (2101). The given threshold is an acceptable distance from basic point data to data that can be migrated to the external heap. In the case where the distance of the data selected in Step 804 is greater than the given threshold (YES in 2101), the processing proceeds to Step 806. The data migration feasibility determining module 107 then attaches a "migration disabled" flag to the affiliated class of the data whose distance from the basic point data is greater than the given threshold (806). In the example of FIG. 18, the distances of the data 1905, the data

1901, and the data 1902 from the basic point data 1903 are greater than the threshold, 2, and the "migration disabled" flag is attached to a class N, a class J, and a class K to which the data 1905, the data 1901, and the data 1902 belong respectively. Data belonging to the classes to which the "migration disabled" flag is attached is not migrated to the external heap (see FIG. 15).

As described above, according to this modification example, whether migration to an external heap is possible or not can be determined based on the distance of data (the number of references traced from basic point data), instead of the reference depth of the data.

(Control Logic Used for a List Structure)

The description given above deals with a case where reference relations of check targets have a circle structure. Described here is a case where reference relations of check targets have a list structure.

Figure 21:
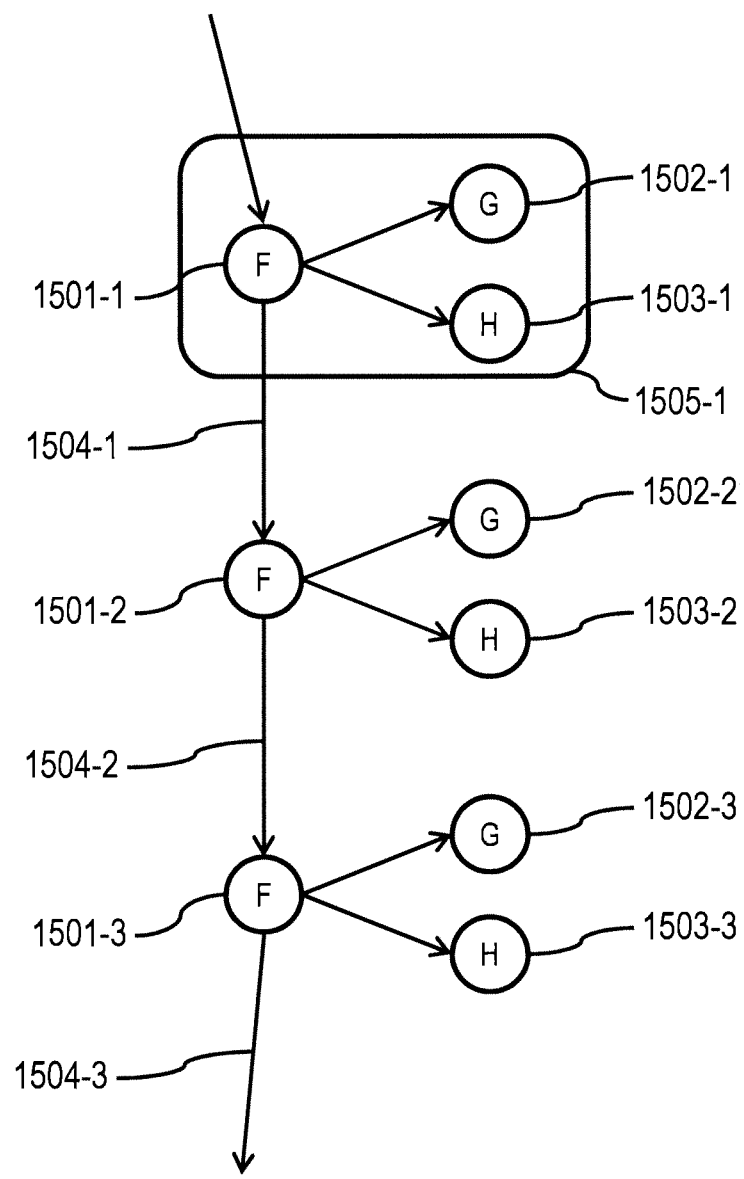
FIG. 21 is a diagram illustrating list structure reference relations among pieces of data.

FIG. 21 is a diagram illustrating list structure reference relations among pieces of data. In FIG. 21, a circular mark represents data, an alphabet letter inside the circular mark represents the affiliated class of the data, and an arrow represents a reference relation between pieces of data. The reference 1504-1, for example, indicates that the data 1501-1 whose affiliated class is F refers to the data 1501-2, which belongs to the same class, F.

In a list structure, a data set (the data set in FIG. 21 is constituted of elements which are the data 1501-1 (2, 3), the data 1502-1 (2, 3), and the data 1503-1 (2, 3)) is made available for reference through reference between pieces of data (in FIG. 21, the reference 1504-1 and a reference 1504-2 between the data 1501-1, the data 1501-2, and the data 1501-3). Most link structure reference relations are formed among pieces of data that belong to the same class. In the example of FIG. 21, the data 1501-1, the data 1501-2, and the data 1501-3 which belong to the same class are in a reference relation. In FIG. 21, only the data 1501-1, the data 1502-1, and the data 1503-1 which are within an enclosure 1505-1 are pieces of data that should be placed in the same external heap.

Figure 22:
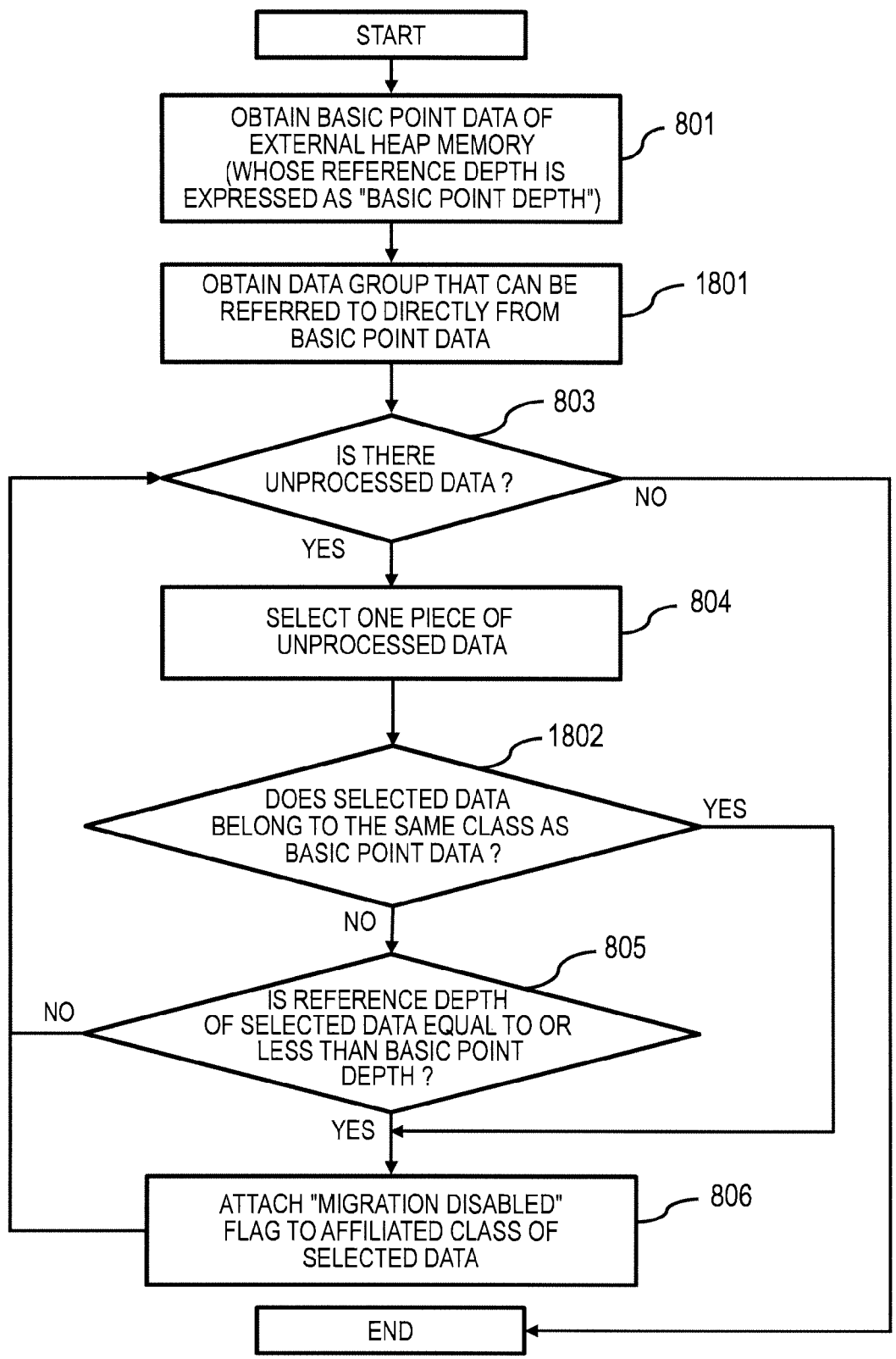
FIG. 22 is a flow chart illustrating control logic for determining the migration feasibility of list structure data based on the reference depth of the data according to the embodiment of this invention.

FIG. 22 is a flow chart illustrating control logic for determining the migration feasibility of list structure data based on the reference depth of the data according to the embodiment of this invention. FIG. 22 is obtained by replacing Step 802 of FIG. 14 with Step 1801 and adding Step 1802. The following description uses the same symbols for steps that have the same functions as in FIG. 14, in order to omit a repetitive description. The control logic of FIG. 22 corresponds to Step 1002 of FIG. 13.

In Step 1801, the data migration feasibility determining module 107 obtains data that can be referred to directly from basic point data (1801). In the example of FIG. 22, the data 1502-1, the data 1503-1, and the data 1501-2 which can be referred to directly from the basic point data 1501-1 are obtained.

In Step 1802, the data migration feasibility determining module 107 determines whether or not the data selected in Step 804 and the basic point data belong to the same class (1802). In the case where the former and the latter belong to the same class (YES in 1802), the processing proceeds to Step 806. In the example of FIG. 21, the data 1501-2 and the basic point data 1501-1 belong to the same class, F (YES in 1802), and a "migration disabled" flag is therefore attached to the class F. The data 1501-2 and other pieces of data that belong to the class F to which the "migration disabled" flag is attached are not migrated to the external heap (see FIG. 15).

Figure 23:
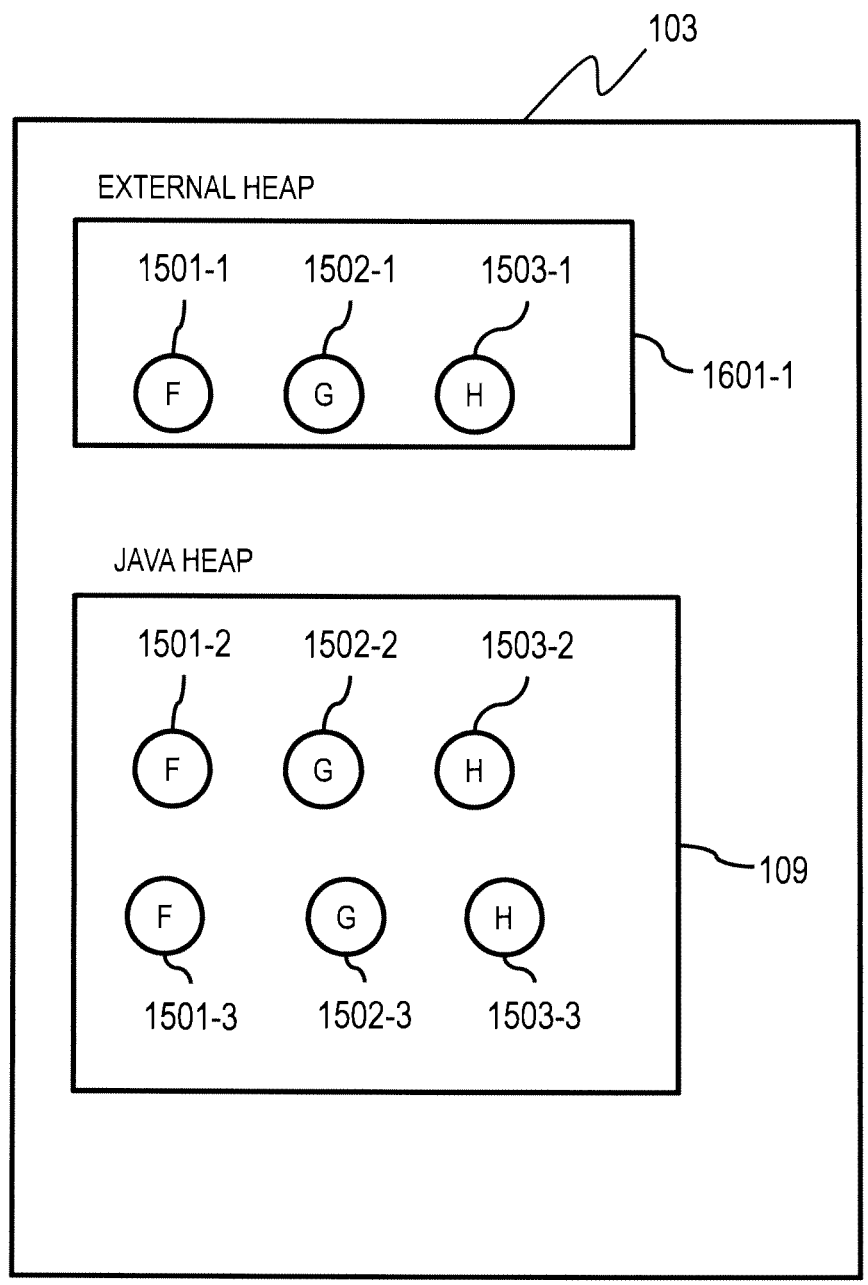
FIG. 23 is a diagram illustrating how data is placed when the embodiment of this invention is applied to the list structure data of FIG. 21.

FIG. 23 is a diagram illustrating how data is placed when this invention is applied to the list structure data of FIG. 21. The data 1501-1, the data 1502-1, and the data 1503-1 which are within the enclosure 1505-1 are placed in an external heap 1601-1. Other data groups are not migrated and are placed in the Java heap 109.

Figure 24:
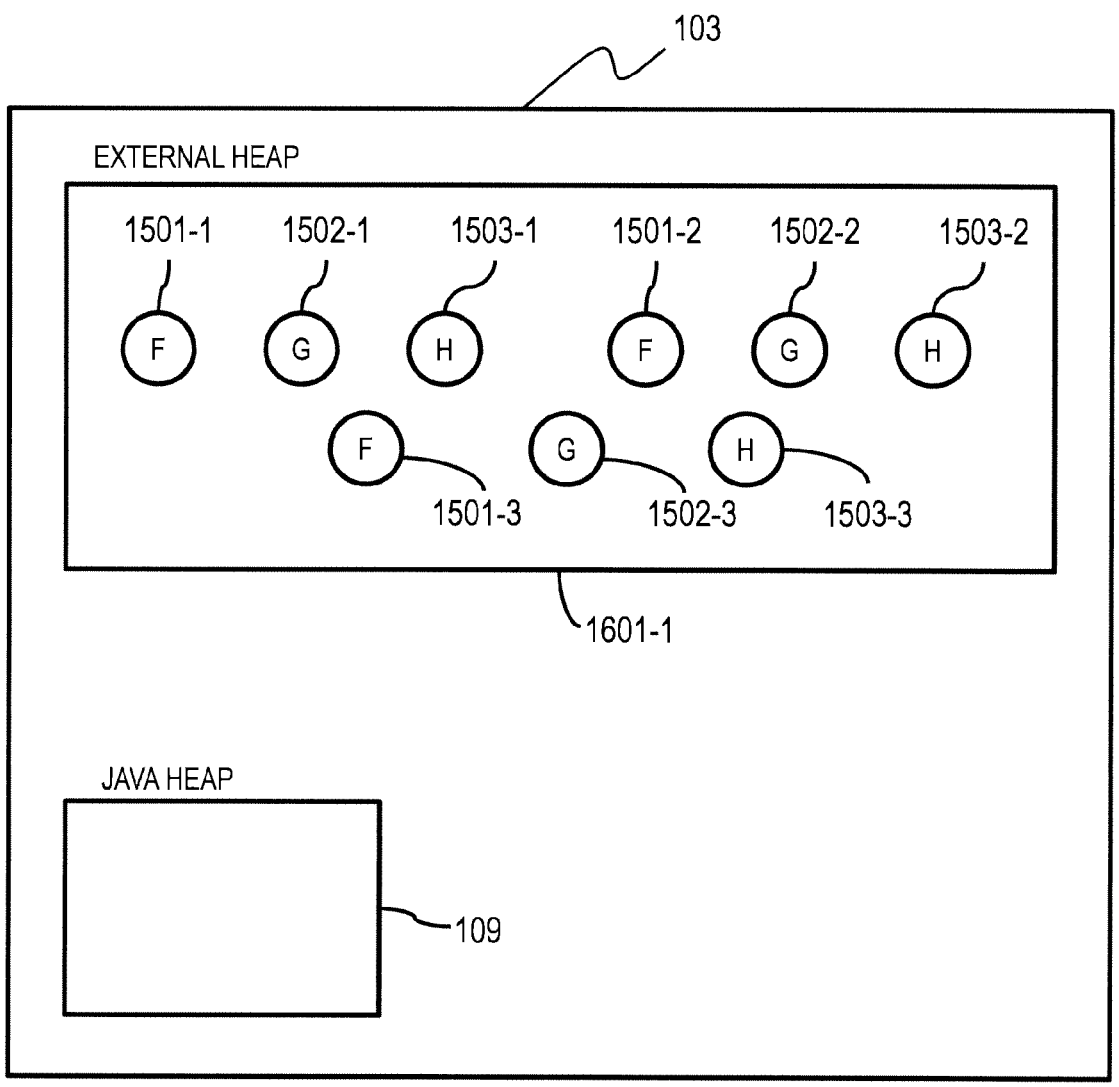
FIG. 24 is a diagram illustrating how data is placed when a conventional data placement method is applied to the list structure data of FIG. 21.

FIG. 24 is a diagram illustrating how data is placed when a conventional data placement method is applied to the list structure data of FIG. 21. The data 1501-2 (3), the data 1502-2 (3), and the data 1503-2 (3) which are not supposed to be migrated to the external heap 1601-1 are placed in the external heap 1601-1. This gives rise to such problems as the difficulty in estimating the consumed amount of the external heap and a large difference among external heaps in terms of the period of time in which an external heap is kept allocated. In other words, these problems are solved by applying this invention and employing the data placement of FIG. 23.

An embodiment of this invention has now been described. However, the embodiment described above is just an application example of this invention, and is not intended to limit the technical scope of this invention to the specific configurations of the embodiment.

What is claimed is:

1. A method of managing a memory in a computer system including a processor for executing a program and the memory, the memory including a first area, which is managed by a garbage collector, and a second area, which is not managed by the garbage collector, the method comprising the steps of:

checking, by the processor, a reference relation of basic point data associated with the second area by tracing references from the basic point data, the basic point data having an affiliation with a class in which the basic point data is grouped;

in a case where the reference relation of the basic point data has a structure including a reference to data having an affiliation with the same class as the class in which the basic point data is grouped, determining, by the processor, that particular data out of data comprising the structure is prohibited from being migrated to the second area; and migrating, by the processor, to the second area, data stored in the first area out of data remaining after excluding the particular data from the data that comprises the structure.

2. The method of managing a memory according to claim 1, wherein, in a case where the reference relation of the basic point data has a circle structure in which tracing references from the basic point data results in referring to the basic point data again, the step of determining comprises determining, by the processor, that particular data out of data comprising the circle structure is prohibited from being migrated to the second area.

3. The method of managing a memory according to claim 2, wherein the particular data is, out of data which has a reference relation with the basic point data, data whose reference depth is less than a reference depth of the basic point, the reference depth being a number of references traced from root set data.

4. The method of managing a memory according to claim 2, wherein the particular data is, out of data which has a reference relation with the basic point data, data whose distance is greater than a predetermined number, the distance being a number of references traced from basic point data.

5. The method of managing a memory according to claim 1, wherein, in a case where the reference relation of the basic point data has a list structure in which the basic point data refers to data belonging to the same class as the class of the basic point data, the step of determining comprises determining, by the processor, that, out of data comprising the list structure, data belonging to the same class as the class of the basic point data and data referred to directly or indirectly from the data belonging to the same class as the class of the basic point data are prohibited from being migrated to the second area.

6. The method of managing a memory according to claim 1, wherein the step of checking comprises starting, by the processor, checking of the reference relation of the basic point data at a time specified via one of a program API, a startup option, and an external file.

7. A computer system comprising a processor for executing a program and a memory, wherein:
   the memory includes a first area, which is managed by a garbage collector, and a second area, which is not managed by the garbage collector;
   the processor checks a reference relation of basic point data associated with the second area by tracing references from the basic point data, the basic point data having an affiliation with a class in which the basic point data is grouped;
   the processor, in a case where the reference relation of the basic point data has a structure including a reference to data having an affiliation with the same class as the class in which the basic point data is grouped, determines that particular data out of data comprising the structure is prohibited from being migrated to the second area; and
   the processor migrates data stored in the first area out of data remaining after excluding the particular data from the data which comprises the structure to the second area.

8. A computer-readable non-transitory data storage medium containing memory managing instructions stored therein, the instructions being executable by a processor to cause the processor to perform operations comprising:
   checking, by the processor, a reference relation of basic point data associated with a second area by tracing references from the basic point data, the basic point data having an affiliation with a class in which the basic point data is grouped;
   in a case where the reference relation of the basic point data has a structure including a reference to data having an affiliation with the same class as the class in which the basic point data is grouped, determining, by the processor, that particular data out of data comprising the structure is prohibited from being migrated to the second area; and
   migrating, by the processor, to the second area, data stored in a first area out of data remaining after excluding the particular data from the data comprising the structure.

\* \* \* \* \*